US012607164B2

(12) United States Patent
Strunz et al.

(10) Patent No.: US 12,607,164 B2
(45) Date of Patent: Apr. 21, 2026

(54) METHOD AND SYSTEM FOR DETERMINING A SETPOINT SIGNAL OF A WIND ENERGY CONVERSION SYSTEM

(71) Applicant: TECHNISCHE UNIVERSITÄT BERLIN, Berlin (DE)

(72) Inventors: Kai Strunz, Berlin (DE); Maren Kuschke, Werder/havel (DE); Khaled Almunem, Berlin (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 351 days.

(21) Appl. No.: 18/267,879

(22) PCT Filed: Dec. 17, 2021

(86) PCT No.: PCT/EP2021/086435
§ 371 (c)(1),
(2) Date: Jun. 16, 2023

(87) PCT Pub. No.: WO2022/136156
PCT Pub. Date: Jun. 30, 2022

(65) Prior Publication Data
US 2024/0077059 A1 Mar. 7, 2024

(30) Foreign Application Priority Data

Dec. 23, 2020 (EP) ..................................... 20216978

(51) Int. Cl.
*F03D 7/04* (2006.01)
*F03D 7/02* (2006.01)

(52) U.S. Cl.
CPC .............. *F03D 7/042* (2013.01); *F03D 7/02* (2013.01); *F05B 2220/30* (2013.01); *F05D 2270/053* (2013.01)

(58) Field of Classification Search
CPC .......... F03D 7/02; F03D 7/042; F03D 7/0272; F03D 7/0276; F03D 7/0284; F05B 2220/30; Y02E 10/72; F05D 2270/053
See application file for complete search history.

(56) References Cited

U.S. PATENT DOCUMENTS

2004/0098431 A1* 5/2004 Sato ....................... H04B 1/667
708/290
2010/0045040 A1* 2/2010 Bendixen ................ F03D 9/255
290/44

(Continued)

FOREIGN PATENT DOCUMENTS

EP 3400384 A1 11/2018
WO WO-2020/031085 A1 2/2020

OTHER PUBLICATIONS

Andra Zertek et al., "A Novel Strategy for Variable-Speed Wind Turbines' Participation in Primary Frequency Control", IEEE Transactions on Sustainable Energy, IEEE, USA, vol. 3. No. 4, Oct. 4, 2012 (Oct. 4, 2012), pp. 791-799, XP011462106, ISSN: 1949-3029, DOI: 10.1109/TSTE.2012.2199773.

(Continued)

*Primary Examiner* — Nicholas Klicos

(57) ABSTRACT

A method is presented for determining a setpoint signal of a wind energy conversion system. The method includes: providing a first input signal, comprising system frequency values of an electric power system, and a second input signal comprising an angular speed value of a wind energy conversion system; determining, from the first input signal, an intermediate signal comprising system frequency deviation values, the system frequency deviation values indicating deviations between the system frequency values and a target frequency value; determining, from the intermediate signal and the first input signal, a power correction signal comprising a first power value; determining, from the second (Continued)

Figure 1:
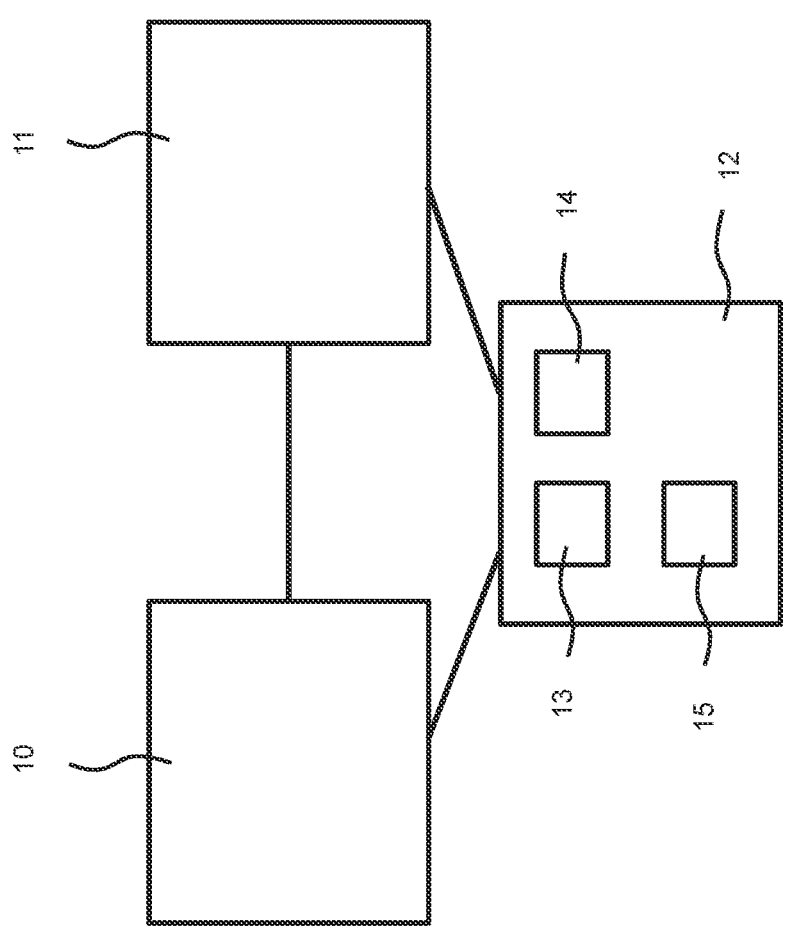

input signal, a first reference signal comprising a second power value corresponding to a point of maximum power extraction of the wind energy conversion system; and determining a setpoint signal for setting an output power value of the wind energy conversion system.

11 Claims, 15 Drawing Sheets

(56)                References Cited

U.S. PATENT DOCUMENTS

| | | | |
|---|---|---|---|
| 2011/0109085 A1* | 5/2011 | Nelson | H02P 9/102 |
| | | | 290/44 |
| 2014/0012516 A1* | 1/2014 | Nielsen | F03D 13/20 |
| | | | 702/33 |
| 2016/0033580 A1* | 2/2016 | Qiao | G01R 31/343 |
| | | | 324/765.01 |

| | | | |
|---|---|---|---|
| 2016/0040653 A1 | 2/2016 | Kang et al. | |
| 2016/0160839 A1 | 6/2016 | Wang et al. | |
| 2017/0130699 A1* | 5/2017 | Achilles | G05B 13/0205 |
| 2018/0003184 A1* | 1/2018 | Dooley | F04D 29/665 |
| 2019/0003456 A1 | 1/2019 | Garcia et al. | |
| 2019/0226943 A1* | 7/2019 | Hayashi | G01M 13/045 |
| 2021/0281071 A1* | 9/2021 | Schwanka Trevisan | H02J 3/24 |

OTHER PUBLICATIONS

Extended European Search Reports issued on Jun. 15, 2021 by the European Patent Office in EP Patent Application No. 20216978.5.
Office Action issued on Feb. 10, 2023 by the European Patent Office for EP Patent Application No. 20216978.5.
International Search Report and Written Opinion of the International Searching Authority, issued in PCT/EP2021/086435, mailed Mar. 16, 2022; ISA/EP.

* cited by examiner (a)

(b)

(a)

(b)

(c)

(d)

METHOD AND SYSTEM FOR DETERMINING A SETPOINT SIGNAL OF A WIND ENERGY CONVERSION SYSTEM

CROSS-REFERENCE TO RELATED APPLICATIONS

This application is a 371 U.S. National Phase of International Application No. PCT/EP2021/086435, filed on Dec. 17, 2021, which claims priority to European Patent Application No 20216978.5 filed on Dec. 23, 2020. The entire disclosures of the above applications are incorporated herein by reference.

The present disclosure refers to a method and a system for determining a setpoint signal of a wind energy conversion system.

BACKGROUND

With the increasing trend towards renewable energy sources (RES), the share of wind energy is steadily rising in electric power transmission and distribution systems. Wind energy conversion systems (WECS) such as wind power plants are characterized by a fluctuating power output due to wind speed variations. If an electric power system comprises a large share of wind power, fluctuating output power of the wind power plants results in significant variations of the power system frequency. With stronger system frequency variations, the power system will operate closer to its frequency limits and may even violate the frequency limits.

As WECS play an increasingly important role in power systems, they should be involved in mitigating such system frequency variations. Methods relying on energy storage system (ESS) devices such as batteries and flywheels to regulate the output power of the WECS for mitigating the system frequency variations are known. Although the utilization of ESS could mitigate the system frequency variations without influencing control of the WECS, equipping the WECS with ESS generally involves additional investments.

But even without explicitly using ESS, the output power of the WECS can be regulated to mitigate the system frequency variations by modifying the control of the WECS. E.g., modified pitch angle control methods to minimize output power fluctuations of WECS via aerodynamic power curtailment are known. However, with increased blade pitching, these methods result in an average decrease of the output power of the WECS.

Other methods modify the control of a power converter of the WECS in order to utilize kinetic energy stored in a rotating mass of WECS with variable-speed. By increasing or decreasing the rotor speed, kinetic energy can be stored in or released from the rotating mass of the WECS in order to regulate the output power and thereby mitigate the system frequency variations. As opposed to the application of the pitch control methods, the rotating mass of the WECS with variable-speed serves as an energy buffer to minimize an average power reduction of the WECS. The usage of the energy buffer, however, needs to satisfy rotational speed and torque limits of wind turbines of the WECS. The methods that utilize the kinetic energy stored in the rotating mass of the WECS have been proposed for smoothing the output power of WECS or counteracting system frequency variations caused by system disturbances.

The article M. Kuschke and K. Strunz, "Energy-efficient dynamic drive control for wind power conversion with PMSG: modeling and application of transfer function analysis," *IEEE Journal of Emerging and Selected Topics in Power Electronics*, vol. 2, no. 1, pp. 35-46, 2014, refers to a method for transfer function based modeling providing an insight into the systemic behavior of WECS. An originally nonlinear behavior of a drive system covering turbine, a permanent magnet synchronous generator, and a power electronic converter is rearranged and linearized, resulting in a compact transfer function description.

The article S. Hellmuth, M. Kuschke, K. Strunz and M. V. Escudero, "System frequency variations and the effect of wind power: analysis based on an Irish transmission system test model," *CIGRE Symposium Aalborg, Aalborg*, Denmark, 2019, pertains to investigating system frequency variations caused by variable wind power generation. Two use cases are simulated that are characterized by power electronics penetration levels of 60% and 80%, respectively. The employed grid model is based on the Irish transmission system and adapted according to a future energy scenario of 2040.

The document US 2016/040653 A1 describes an inertial control method of a wind turbine including the steps of: acquiring frequency information of a power grid; calculating a time variant droop coefficient when the frequency information is reduced below a preset range; and controlling the wind turbine using the calculated time variant droop coefficient, wherein the step of calculating a time variant droop coefficient includes the steps of: collecting rotor speed information changing according to the inertial control; and calculating the time variant droop coefficient using the collected rotor speed information.

According to the document US 2016/160839 A1, a method of controlling inertia response of variable-speed wind turbine generator includes following steps. A maximum wind power of the wind turbine is gotten through a wind speed and a rotation speed at the hub of the wind turbine based on a maximum wind power tracking control strategy. The maximum wind power is set as an active power control reference value of the wind turbine. A grid frequency is obtained via a frequency measurement equipment. An additional active power control reference value of the wind turbine is generated based on the grid frequency via an additional control block, and the additional active power control reference value is added on the active power control reference value, wherein a total of active power control reference value of the wind turbine is the sum of the active power control reference value and the additional active power control reference value.

In the article A. Žertek, G. Verbič and M. Pantoš, "A Novel Strategy for Variable-Speed Wind Turbines' Participation in Primary Frequency Control", *IEEE Transactions on Sustainable Energy*, vol. 3, no. 4, pp. 791-799, 2012, a strategy for participation of variable speed wind turbines in primary frequency control is proposed based on the deployment of the kinetic energy of the rotating masses to reduce the need for deloaded operation while still being able to provide the required power reserve for the defined time frame.

The document EP 3 400 384 A1 relates to a method for controlling a wind power plant, WPP, comprising a plurality of wind turbine generators, WTGs, connected to an electrical grid, the method comprising: setting a plant power reference (Ptotal) according to an electrical value of the electrical grid; determining an inertia delta power reference (IRdeltaP) required for the WPP to meet a power demand in response to a change in the electrical value; adding the inertia delta power reference and the plant power reference (Ptotal) to form a power reference (Ptotalref); deriving an overboost reference (PrefOB) as the difference between the power reference (Ptotalref) and an available power value; dispatching the power reference (Ptotalref) to each wind turbine generator; and dispatching the overboost reference (PrefOB) to each wind turbine generator.

SUMMARY

It is an object of the present disclosure to provide a method for controlling a wind energy conversion system in order to mitigate variations of the system frequency of an electric power system.

For solving the problem, a method for determining a setpoint signal of a wind energy conversion system according to independent claim 1 is provided. Further, a system for determining a setpoint signal of a wind energy conversion system is provided. Further embodiments are disclosed in dependent claims.

According to one aspect, a method for determining a setpoint signal of a wind energy conversion system is provided. The method comprises, in a system comprising at least one signal processing device: providing a first input signal, comprising system frequency values of an electric power system, and a second input signal comprising an angular speed value of a wind energy conversion system; determining, from the first input signal, an intermediate signal comprising system frequency deviation values, the system frequency deviation values indicating deviations between the system frequency values and a target frequency value, including determining at least one periodic frequency component from the first input signal; determining, from the intermediate signal and the first input signal, a power correction signal comprising a first power value; determining, from the second input signal, a first reference signal comprising a second power value corresponding to a point of maximum power extraction of the wind energy conversion system; and determining, from the power correction signal and the first reference signal, a setpoint signal for setting an output power value of the wind energy conversion system.

According to another aspect, a system for determining a setpoint signal of a wind energy conversion system is provided, comprising at least one signal processing device. The at least one signal processing device is configured to perform a method for determining the setpoint signal of the wind energy conversion system.

The technology proposed allows for exploiting cyclical variations of the system frequency associated with cyclical variations of the wind speed so as to mitigate the periodic frequency variations.

The wind energy conversion system may be connected, in particular electrically connected, to the electric power system. The wind energy conversion system can be one of a wind power plant, a wind turbine, a plurality of wind power plants, a plurality wind turbines. The wind energy conversion system comprises a rotor. Moreover, setting the output power of the wind energy conversion system may comprise storing or releasing kinetic energy of the rotor. The angular speed value refers to the angular speed value of the rotor. Setting the output power may affect the angular speed of the rotor.

The electric power system can be utilized or applied for transmitting and/or distributing electric power. Electric power can be transferred between the wind energy conversion system and the electric power system.

The system frequency values of the electric power system may deviate around the target frequency value. The target frequency value may be a target value of the electric power system and, for example, be 16.7 Hz, 50 Hz, or 60 Hz.

The system for determining the setpoint signal of the wind energy conversion system may be coupled with and/or connected to the wind energy conversion system and/or the electric power system, preferably allowing for signal transfer.

The system may be included in the wind energy conversion system, for example in control units of the wind energy conversion system. The system may also be separated from the wind energy conversion system. The system may comprise a first, a second, and a third signal processing device. Each of the first, the second, and the third signal processing device can be a separate processor. Alternatively, the first, the second, and the third signal processing device can be integrated in a single processor.

The power correction signal may be determined in a first module. Further, the first reference signal may be determined in a second module. The setpoint signal may be determined in a third module. The first, the second, and the third module may be implemented in the first, the second, and the third signal processing device, respectively. At least one of or all of the first, the second, and the third module may also be implemented in a shared signal processing device.

Determining the intermediate signal and the power correction signal may be performed in the first signal processing device, determining the first reference signal may be performed in the second signal processing device, and determining the setpoint signal may performed in the third signal processing device.

The first module may be a frequency-dependent power compensator. The first module may be configured to mitigate the system frequency variations. The second module may be a maximum power point estimator. The point of maximum power extraction of the wind energy conversion system may comprise an estimate for a maximally extractable power from wind and/or an optimum angular speed value, preferably for which the maximally extractable power is achieved. The third module may be configured to provide an operation within a safe operating region of the wind energy conversion system. The first module may comprise a first submodule for mitigating periodic frequency variations, generating a periodic power correction signal, and/or a second submodule for mitigating aperiodic frequency variations, generating an aperiodic power correction signal. The power correction signal may be a sum of the periodic power correction signal and the aperiodic power correction signal. The first submodule and/or the second submodule may be activated or deactivated.

The at least one periodic frequency component may be a value or a value range between $10^{-7}$ Hz and $\mathbf{10^2}$ Hz, preferably between $10^{-5}$ Hz and 10 Hz, more preferably between $10^{-4}$ Hz and 1 Hz. The at least one periodic frequency component may indicate an oscillation or a range of oscillations of the system frequency values. Further, a plurality of frequency components and/or periodic frequency components may be determined.

The method may comprise determining, from the intermediate signal, a spectrum of the system frequency deviation values, the spectrum comprising the at least one frequency component. The spectrum may comprise a magnitude of the at least one frequency component. In particular, the spectrum may comprise a plurality of frequency components and, preferably, one of a plurality of magnitudes for each of the plurality of frequency components.

The system frequency deviation values may be determined by subtracting the target frequency value from the system frequency values.

The spectrum may be determined by applying an integral transform on the system frequency deviation values of a time window. The time window may have a window size (corresponding to a difference between a starting time and an ending time of the time window) of one of 5 minutes, 8 minutes, 10 minutes, 12 minutes, 15 minutes. The integral transform may be a discrete integral transform, particularly one of a discrete cosine transform (DCT), a discrete sine transform (DST), and a discrete Fourier transform (DFT), preferably a fast Fourier transform (FFT). The integral transform may be calculated at the end of the time window. Further, a plurality of spectra may be determined from a plurality of time windows. The time windows may overlap. It may be provided that each of the plurality of spectra is determined after a predefined time step. The time step may be constant and be, for example, one of 30 seconds, 1 minute, 90 seconds, 2 minutes, and 5 minutes.

The method may comprise determining a first filtered signal by filtering, preferably band-pass filtering, the intermediate signal, employing a frequency band. The band-pass filtering of the intermediate signal may be carried out by a band-pass filtering unit comprising a band-pass. The band-pass filtering of the intermediate signal may comprise passing first frequency components of the frequency band and attenuating and/or removing second frequency components outside the frequency band. The band-pass may comprise a passband width between 0.1 mHz and 10 mHz, preferably between 1 mHz and 3 mHz, more preferably 2 mHz. The band-pass may comprise a center frequency between $10^{-7}$ Hz and $10^2$ Hz, preferably between $10^{-5}$ Hz and 10 Hz, more preferably between $10^{-4}$ Hz and 1 Hz.

The band pass-filtering of the intermediate signal may comprise employing a plurality of frequency bands, preferably by employing a plurality of band-passes, each in one of a plurality of band-pass filter units. The plurality of band-pass filter units may be arranged serially or, preferably, in parallel. A number of band-pass filter units may be variable. The number of band-pass filter units may be chosen depending on characteristics of the first input signal.

The method may comprise determining the frequency band from the spectrum. The frequency band may comprise a dominating frequency component of the spectrum. The dominating frequency component may comprise a largest magnitude of frequency components. The dominating frequency component may be a value or a value range between $10^{-7}$ Hz and $10^2$ Hz, preferably between $10^{-5}$ Hz and 10 Hz, more preferably between $10^{-4}$ Hz and 1 Hz.

Further, a plurality of frequency bands, each with one of a plurality of dominating frequency components, may be determined from the spectrum, for example 2, 3, 4, 5, or 6. The plurality of dominating frequency components may comprise a number of largest magnitudes of frequency components, for example the 2, 3, 4, 5, or 6 largest magnitudes of frequency components. It may also be provided that at least one of the plurality of frequency bands comprises more than one of the plurality of dominating frequency components.

The frequency band may be identified by a frequency band identifying unit. The frequency band identifying unit may transmit frequency band parameters to at least one of the plurality of band-pass filtering units. The frequency band parameters may comprise the passband width and/or the center frequency. Alternatively, the frequency band or the plurality of frequency bands may be fixed.

A first gain may be applied to the first filtered signal, yielding a periodic power signal comprising a filtered periodic power value. The first gain may comprise a first gain parameter.

The filtering may be carried out using an infinite impulse response filter. In particular, the band-pass filtering unit may be the infinite impulse response filter. Alternatively, the filtering may be carried out using a finite impulse response filter. The band-pass filter unit may be tuned manually or automatically.

The method may comprise determining aperiodic frequency deviations from the first input signal. The aperiodic frequency deviations may indicate an unscheduled change of electric power.

The method may comprise determining, from the first input signal, a second filtered signal by filtering the first input signal. In an embodiment, a high-pass filtering may be applied.

Determining the second filtered signal may comprise at least one of: differentiating the first input signal, low-pass filtering the first input signal, and applying a deadband on the first input signal. By differentiating the first input signal, a rate of change of the system frequency values may be determined. By low-pass filtering the first input signal, measurement noise can be reduced, preferably from previously differentiating the first input signal. The deadband may have a variable dead band width.

A second gain may be applied to the second filtered signal, yielding an aperiodic power signal comprising a filtered aperiodic power value. The second gain may comprise a second gain parameter.

Determining the power correction signal may comprise adding the filtered periodic power value of the periodic power signal and the filtered aperiodic power value of the aperiodic power signal, yielding the first power value. A relative weighting of the periodic power signal and the aperiodic power signal can be adjusted by adjusting the first gain and/or the second gain.

Determining the first reference signal may comprise determining a change in electrical output power. In an embodiment, the change in electrical output power may be determined from a power feedback signal comprising a third power value. The third power value may be a difference of the output power value and the second power value. The third power value may be a value of additional electric power that is demanded when mitigating the system frequency deviation at a particular time. An action on the change of electric output power may be delayed depending on a design of a power control loop.

The change of electric output power may be added to a change of mechanical turbine power and, preferably subsequently integrated, resulting in an integrated value. Determining the second power value may comprise adding the integrated value to the angular speed value.

The power feedback signal may be determined from the first reference signal and/or the setpoint signal. Preferably, the change in electrical output power may be determined by subtracting the second power value from the output power value.

The method may comprise determining, from the second input signal, a second reference signal comprising an optimum angular speed value corresponding to the point of maximum power extraction of the wind energy conversion system. In an embodiment, the second power value may be determined using the optimum angular speed value. The second reference signal may be determined in the second module.

Determining the first reference signal may further comprise determining a change in mechanical turbine power, for example from the angular speed value and the optimal angular speed value, alternatively from subtracting the angular speed value and the optimal angular speed value. Determining the change in mechanical turbine power may comprise approximating a mechanical turbine power, for example by locally approximating a function assigned to the mechanical turbine power.

Determining the setpoint signal may comprise determining an optimal power value from the power correction signal and the first reference signal and changing the optimal power value depending on the angular speed value of the wind energy conversion system. The optimal power value may be a sum of the first power value and the second power value. The optimal power value may be changed such that stability constraints of the wind energy conversion system are satisfied.

In particular, the optimal power value may be subject to a decrease when the angular speed value of the wind energy conversion system is smaller than the optimum angular speed value. In this sense, the setpoint signal may be smaller than the optimal power value when the angular speed value of the wind energy conversion system is smaller than the optimum angular speed value. The decrease may be proportional to a cube root value comprising the angular speed value. The setpoint signal may be set to a minimum power value if the angular speed value is smaller than a lower rotor limit.

The setpoint signal may be equal to the optimal power value when the angular speed value of the wind energy conversion system is greater than the optimum angular speed value.

The aforementioned embodiments related to the method for determining the setpoint signal of the wind energy conversion system can be provided correspondingly for the system for determining the setpoint signal of the wind energy conversion system.

DESCRIPTION OF FURTHER EMBODIMENTS

Figure 2:
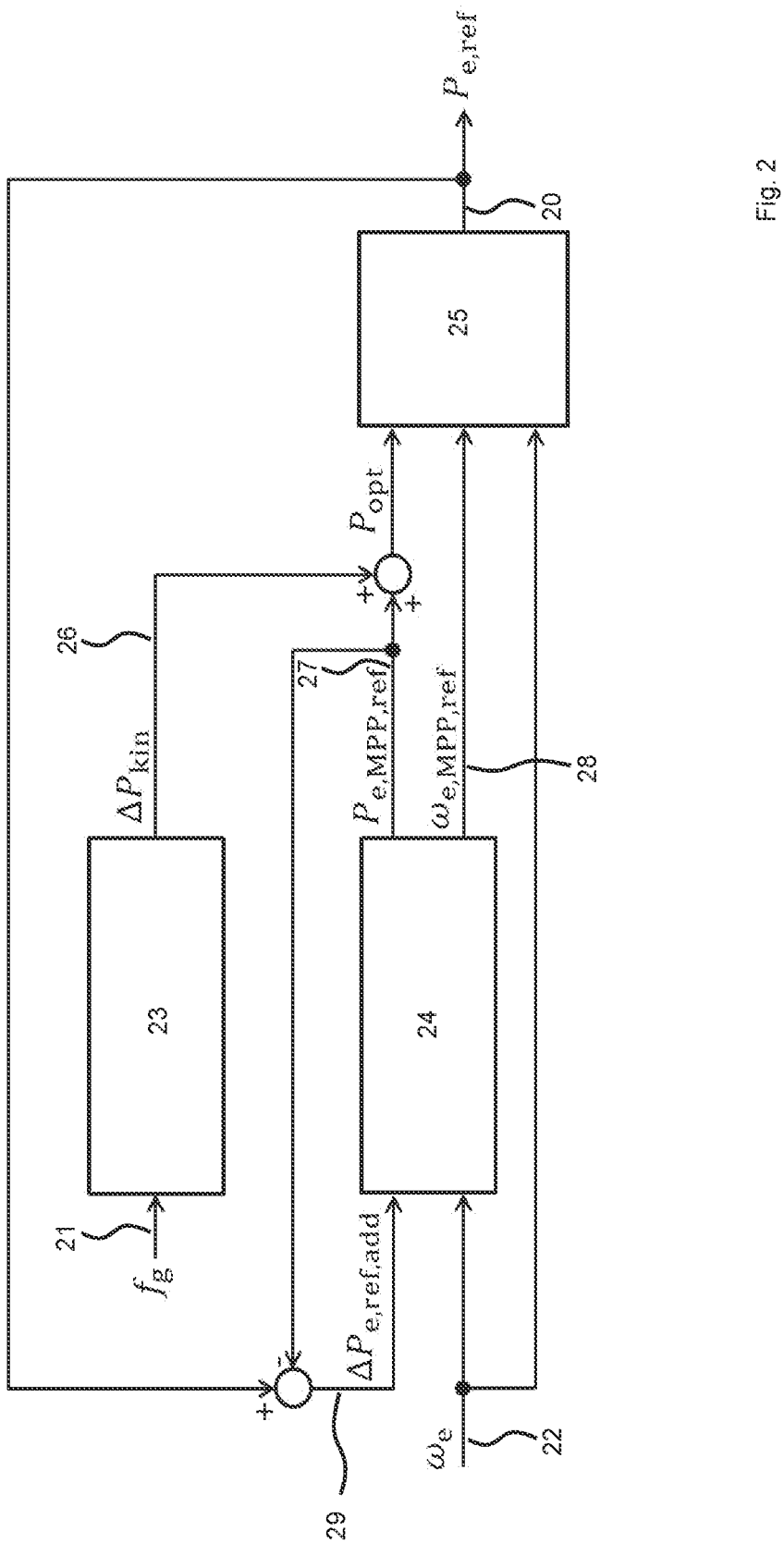
Figure 3:
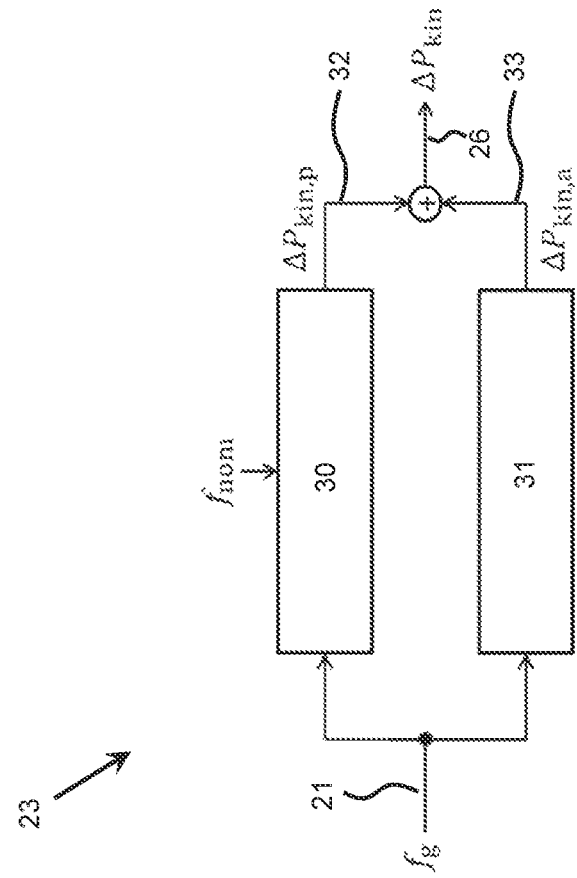
Figure 4:
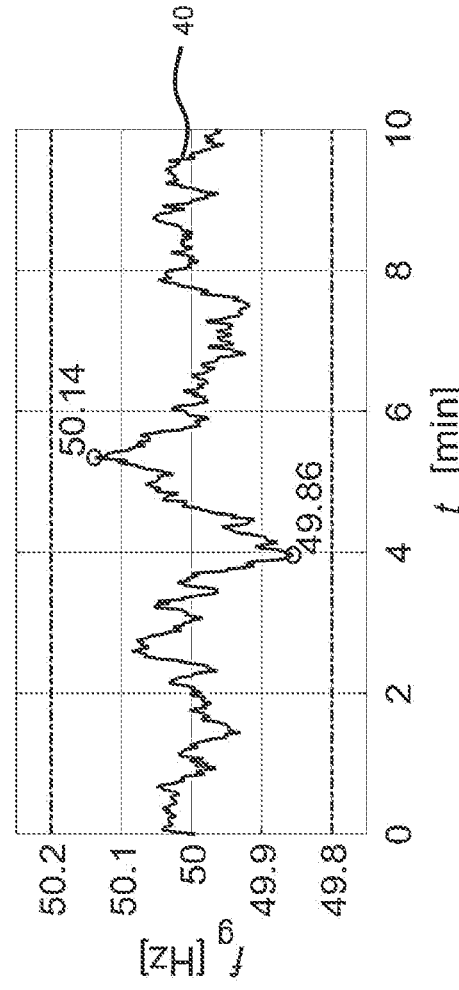
Figure 4:
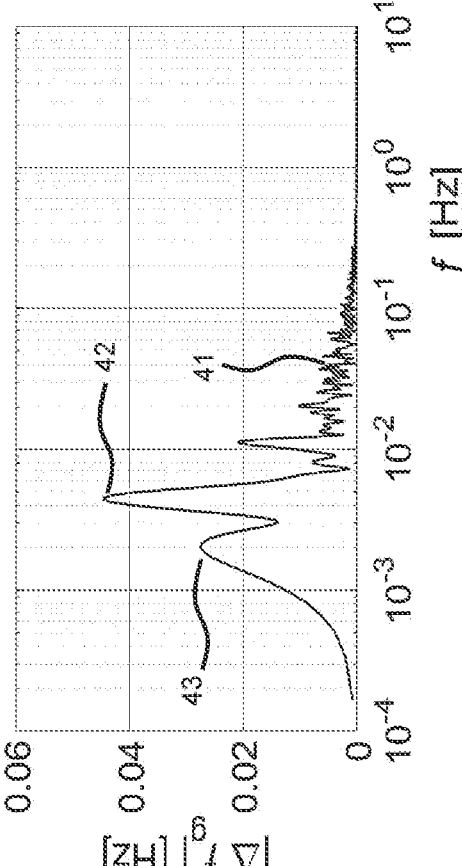
Figure 5:
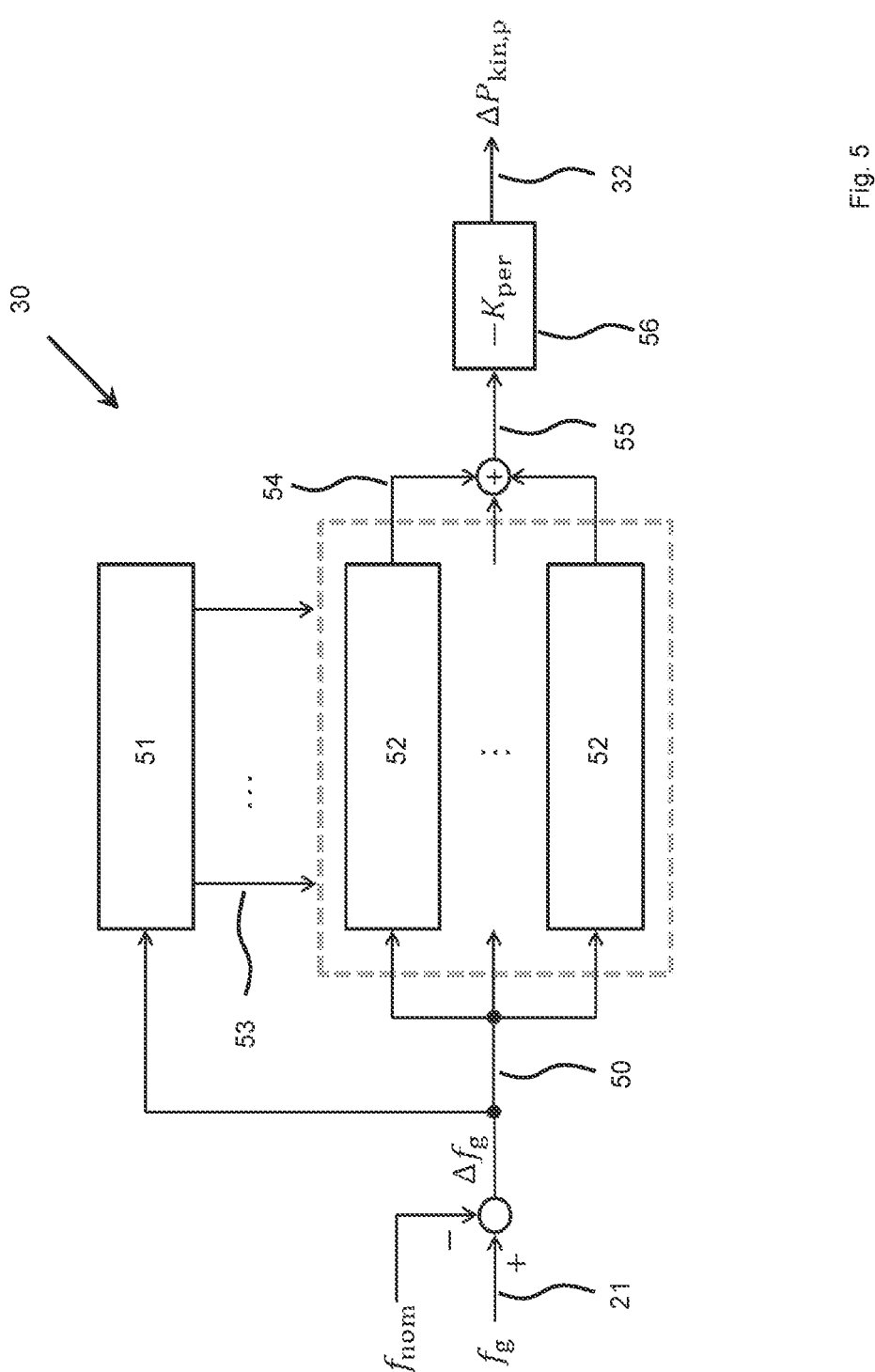
Figure 6:
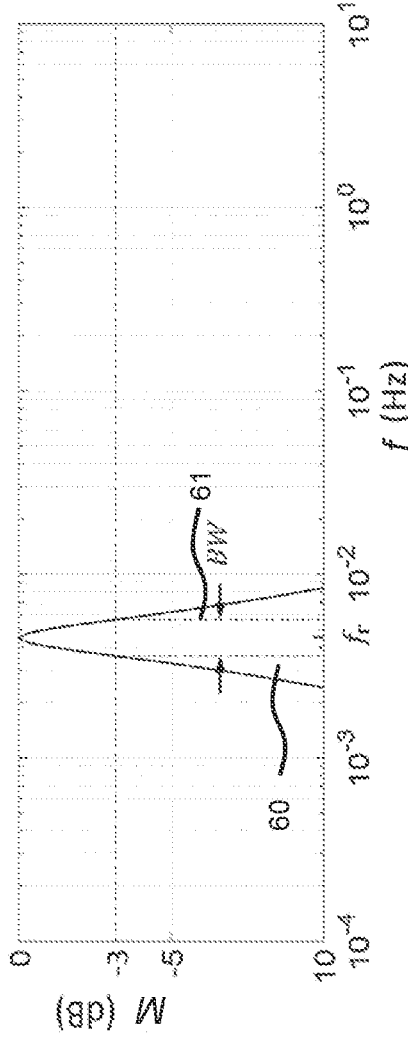
Figure 7:
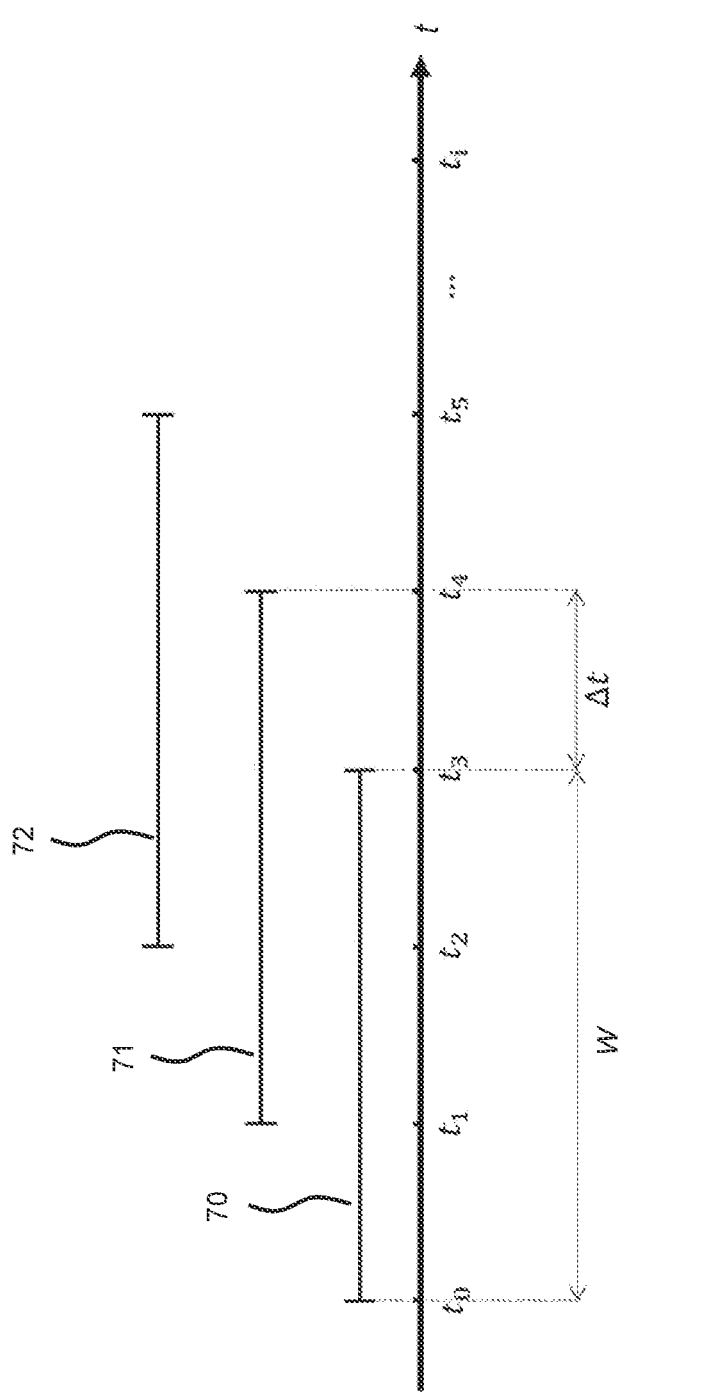
Figure 8:
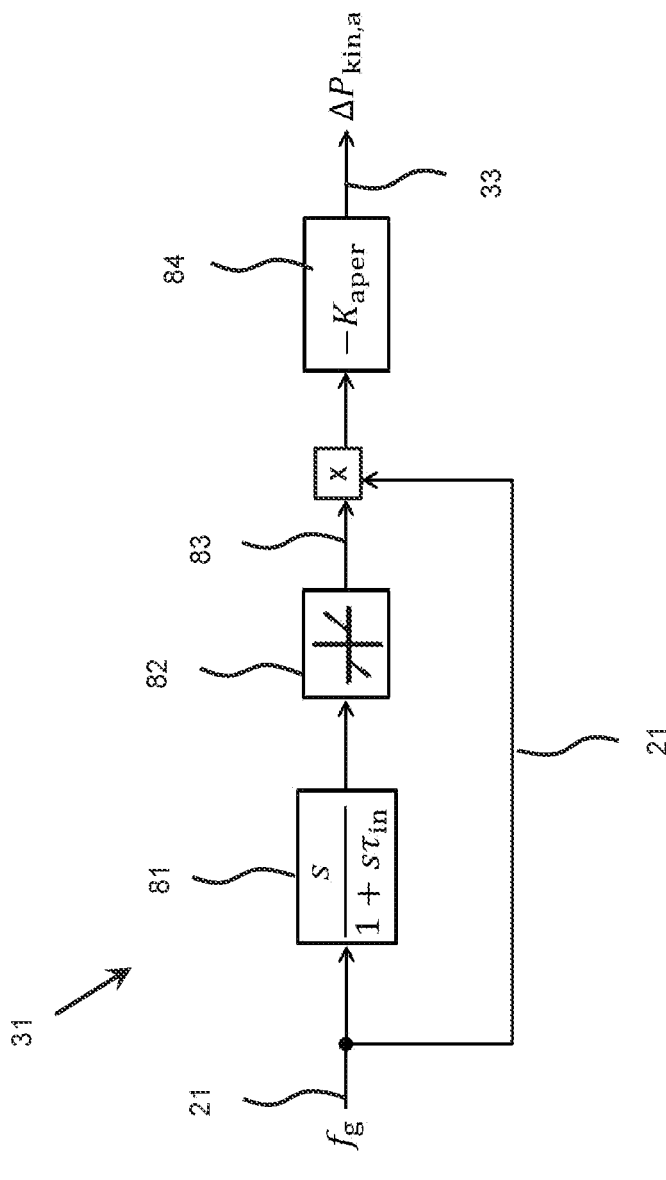
Figure 9:
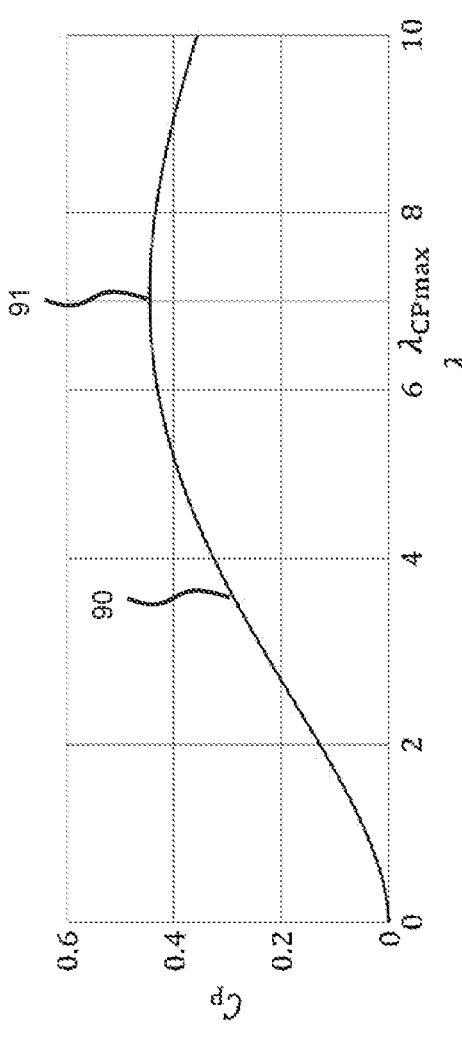
Figure 10:
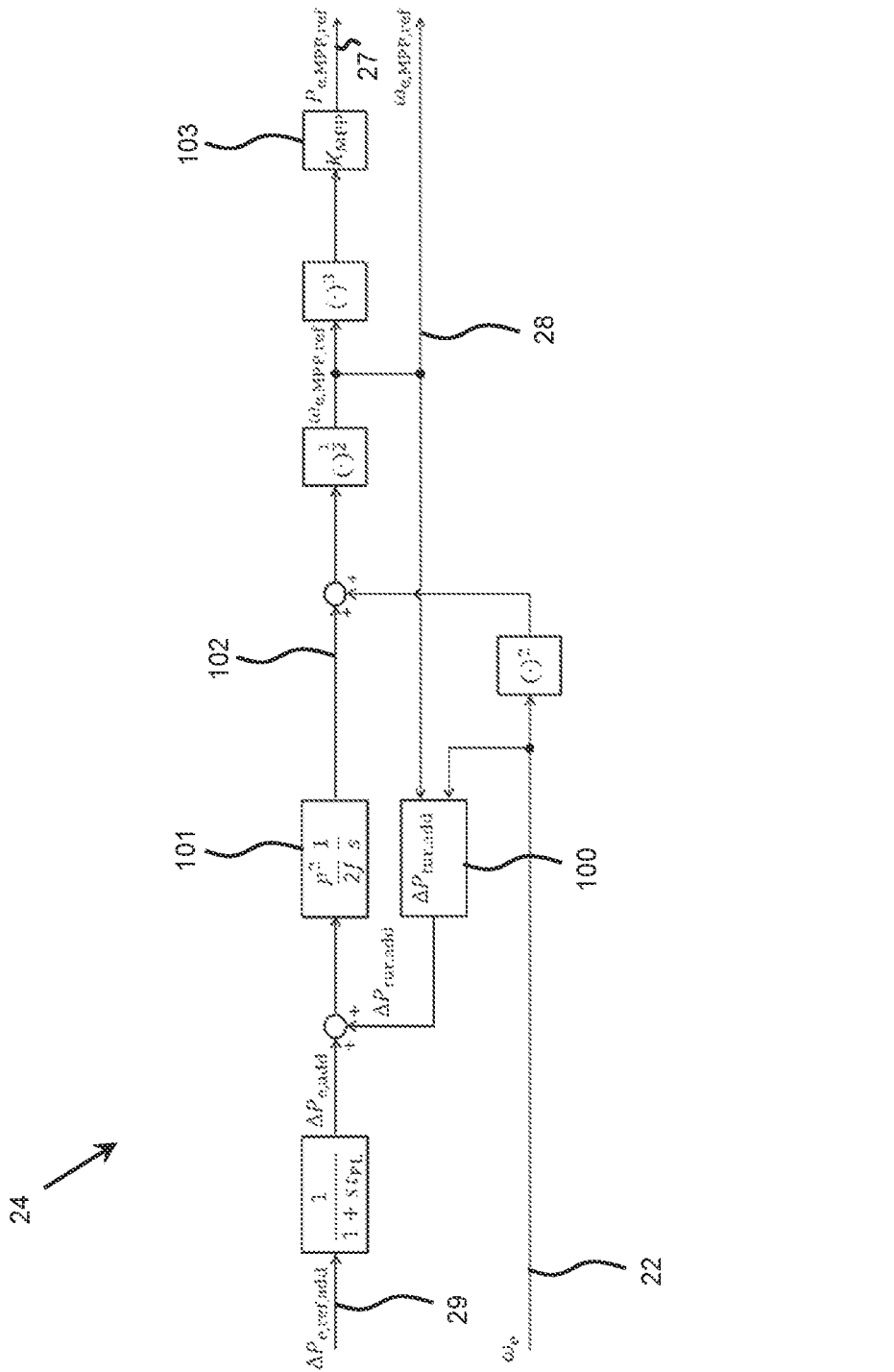
Figure 11:
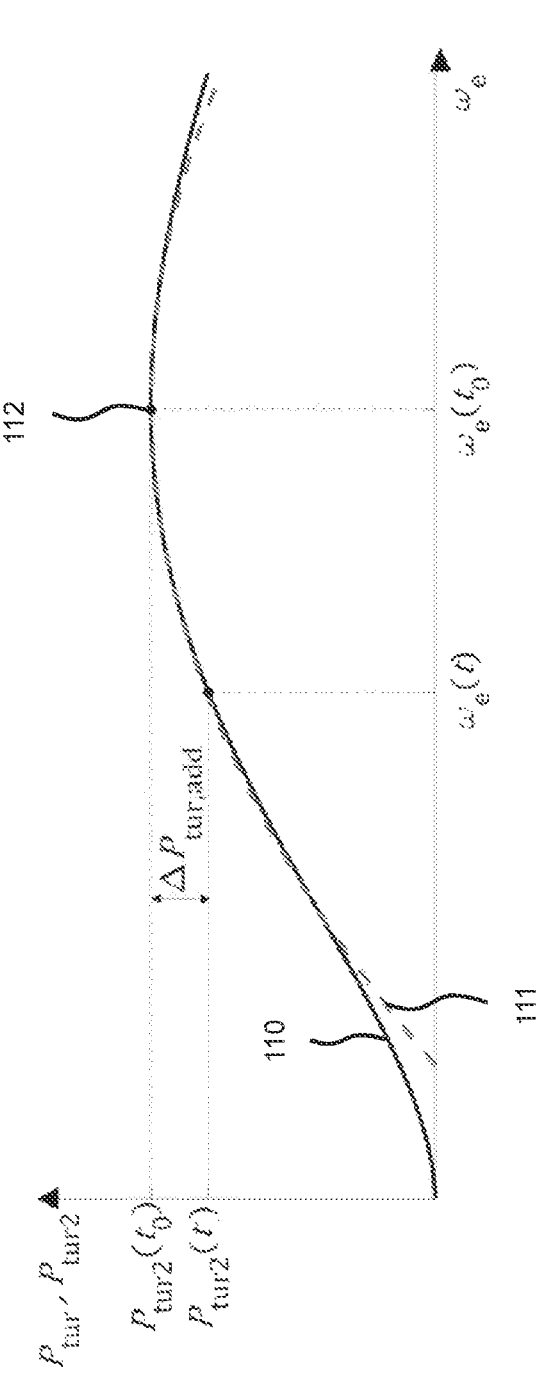
Figure 12:
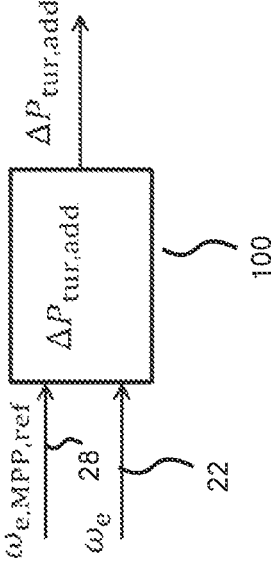
Figure 13:
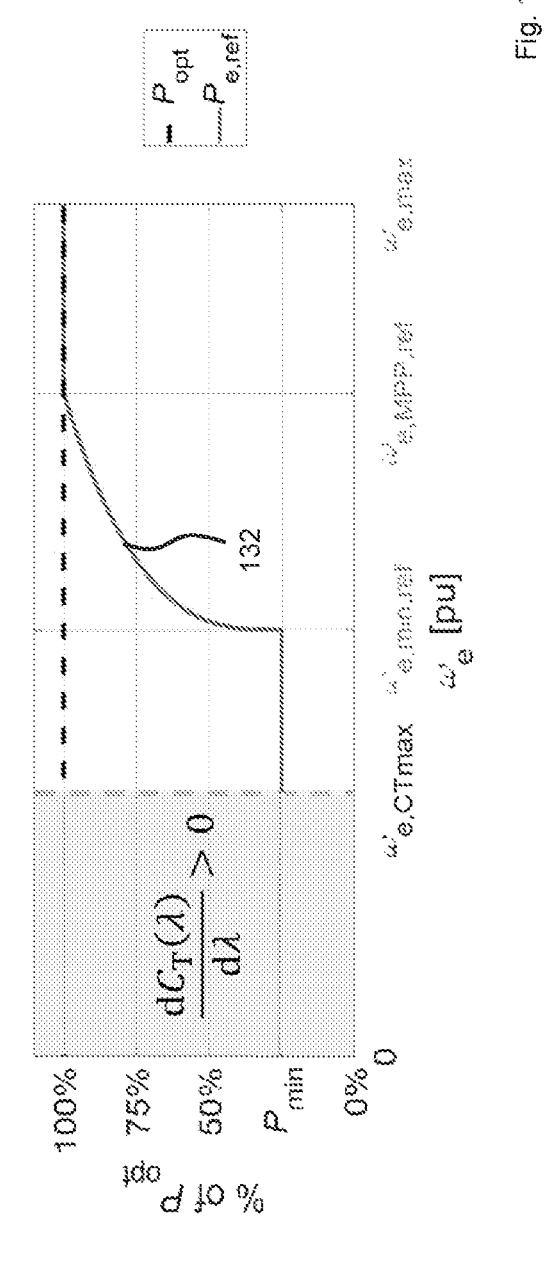
Figure 14:
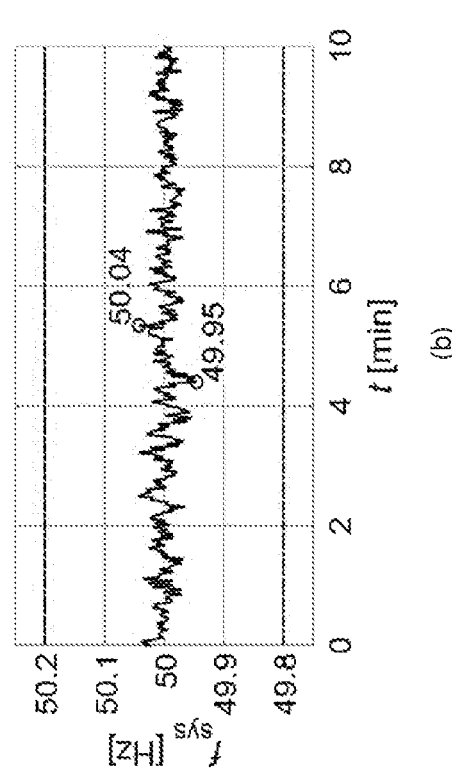
Figure 14:
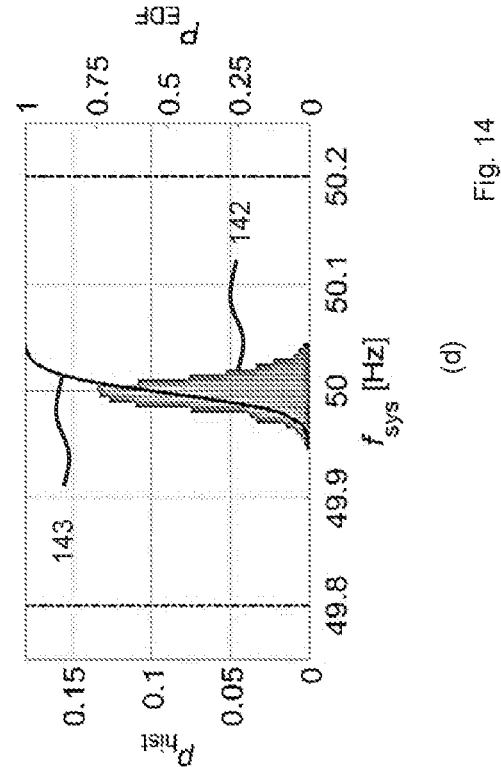
Figure 14:
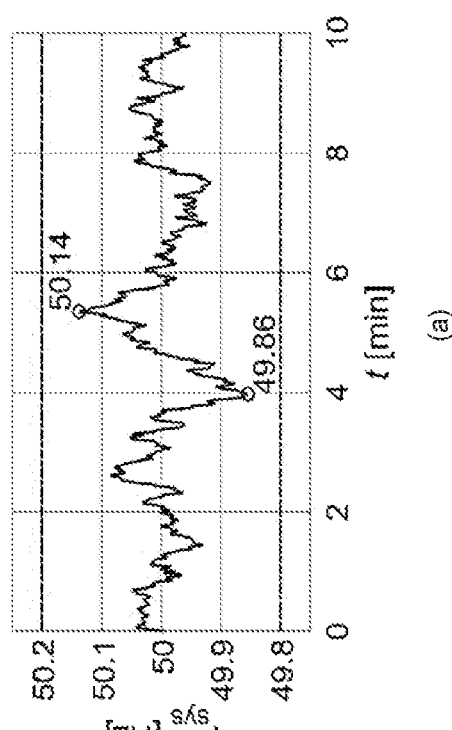
Figure 14:
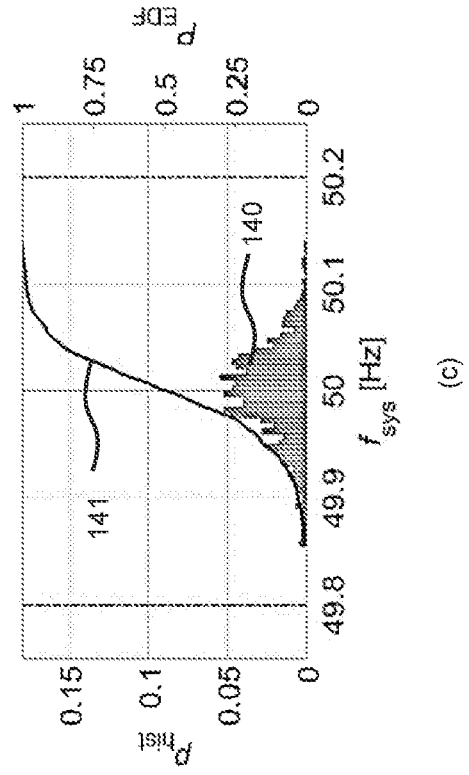
Figure 15:
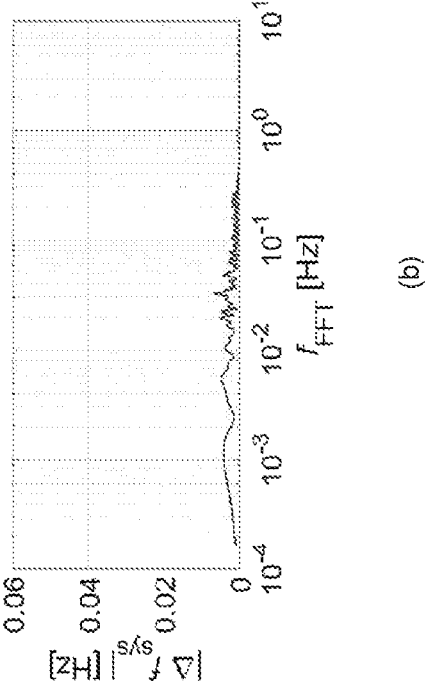
Figure 15:
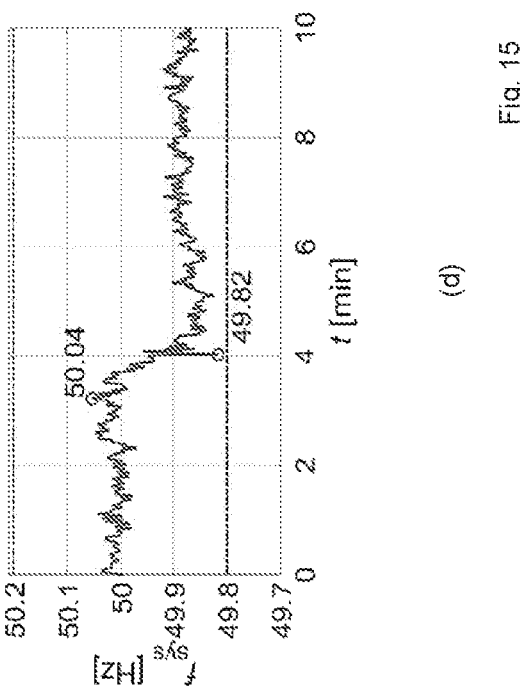
Figure 15:
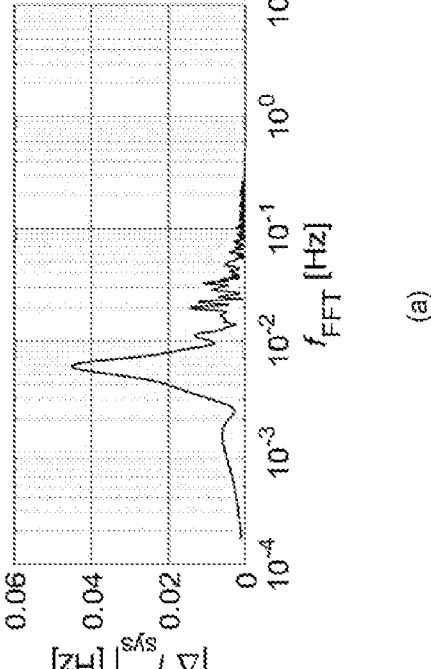
Figure 15:
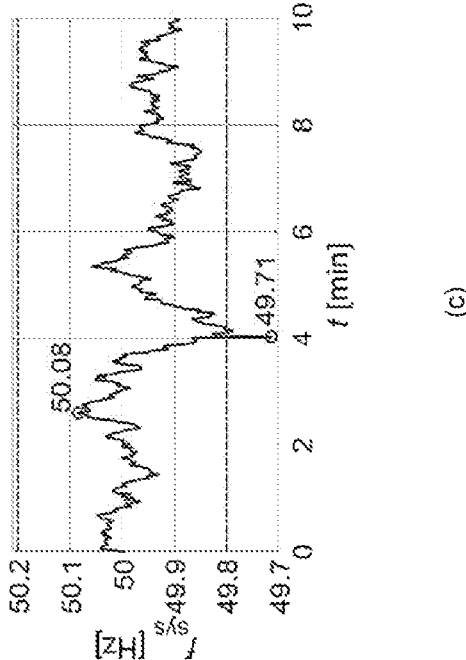

In the following, further embodiments, by way of example, are described with reference to figures. In the figures, show:

FIG. 1 a graphical representation of a wind energy conversion system, an electric power system, and a system for determining a setpoint signal;

FIG. 2 a graphical representation of a method for determining a setpoint signal;

FIG. 3 a graphical representation of a first module;

FIG. 4a a graphical representation of an exemplary time evolution of system frequency values;

FIG. 4b a spectrum of system frequency deviation values;

FIG. 5 a graphical representation of the first submodule;

FIG. 6 a Bode diagram;

FIG. 7 a graphical representation of an automatic online tuning of band-pass filter units;

FIG. 8 a graphical representation of a second submodule;

FIG. 9 a relation of a power coefficient and a tip speed ratio;

FIG. 10 a graphical representation of a second module;

FIG. 11 a graphical representation of a mechanical turbine power depending on an angular speed value;

FIG. 12 a graphical representation of a change of power calculator;

FIG. 13a a graphical representation of a torque coefficient depending on a tip speed ratio;

FIG. 13b a graphical representation for an exemplary embodiment to provide for stability constraints;

FIG. 14a a graphical representation of a first system frequency time evolution;

FIG. 14b a graphical representation of a second system frequency time evolution;

FIG. 14c shows a graphical representation of a first system frequency distribution;

FIG. 14d a graphical representation of a second system frequency distribution;

FIG. 15a a graphical representation of a first spectrum of system frequency deviations;

FIG. 15b a graphical representation of a second spectrum of system frequency deviations;

FIG. 15c a graphical representation of a third system frequency time evolution; and FIG. 15d a graphical representation of a fourth system frequency time.

FIG. 1 shows a graphical representation of a wind energy conversion system 10, an electric power system 11, and a system 12 for determining a setpoint signal.

The wind energy conversion system 10 is electrically connected to the electric power system 11 and can for example be a wind power plant, a wind turbine, or a plurality of wind power plants or wind turbines. The electric power system 11 can transmit and/or distribute electric power. Electric power can be transferred between the wind energy conversion system 10 and the electric power system 11. The electric power system 11 comprises a system frequency (power (line) frequency), which has a target frequency value (nominal value) typically at 50 Hz or 60 Hz. Deviations in the system frequency are generally required to be within small limits around the target frequency value. The system 12 (wind integration processing element) is connected to the wind energy conversion system 10 and the electric power system 11. Signals can be transferred between each of the wind energy conversion system 10, the electric power system 11, and the system 12.

The system 12 may be included in the wind energy conversion system 10. In particular, existing control units of the wind energy conversion system 10 may be slightly modified in order to implement the system 12, preferably without requiring additional hardware. Alternatively, the system 12 is separated from the wind energy conversion system 10. The system 12 comprises a first, a second, and a third signal processing device (13, 14, 15). Each of the first, the second, and the third signal processing device (13, 14, 15) can be a separate processor. Alternatively, the first, the second, and the third signal processing device (13, 14, 15) can be integrated in a single processor.

FIG. 2 shows a graphical representation of a method for determining a setpoint signal 20 of the wind energy conversion system 10.

Wind speed can comprise a characteristic spectrum. Hence, an output power fluctuation spectrum of the wind energy conversion system 10 and therefore also a spectrum of system frequency variations are expected to exhibit similar characteristics. More specifically, a frequency spectrum of the wind speed comprises a low-frequency component and a turbulence component. The turbulence component corresponds to fast fluctuations around a quasi-steady mean wind speed. As the share of wind power in the electric power system 11 increases, the turbulence component is expected to become noticeable in the spectrum of the system frequency deviations. The method may employ the spectrum of the system frequency variations for mitigating periodic system frequency variations. In addition, the method can also mitigate aperiodic system frequency variations caused by aperiodic unscheduled changes of electric power. Both methods utilize the kinetic energy stored in the rotating mass of the WECS.

For mitigating the periodic system frequency variations, a frequency spectrum of the system frequency variations of the electric power system is determined. If the electric power system comprises a large share of wind power, the spectrum is expected to be dominated by specific frequency components. As the dominating frequency components may change during operation, the method enables keeping track of the dominating frequency components via online spectral analysis. As a result, the periodic system frequency deviations with dominating magnitudes are mitigated and kept within a narrow band. Moreover, determining points of maximum power extraction of the wind energy conversion system 10 (maximum power point tracking, MPPT) can still be carried out effectively.

The method also addresses aperiodic system frequency variations that are characterized by a large rate of change of frequency.

The setpoint signal 20 determined by the method serves for setting an output power value $P_{e,ref}$ of the wind energy conversion system 10. The setpoint signal 20 further facilitates mitigating the system frequency variations of the electric power system 11 while simultaneously meeting two requirements: maximization of wind power capture and operation within rotational speed limits and power limits of the wind energy conversion system 10.

To comply with the requirements, the system 12 is provided with a first and a second input signal (21, 22) from measurements and comprises a first, a second, and a third module (23, 24, 25), which may be implemented in a shared signal processing device or, alternatively, in the first, second, and third signal processing device (13, 14, 15), respectively. The first input signal 21 comprises (power) system frequency values $f_g$ and the second input signal 22 comprises (at least) one angular speed value $\omega_e$ of the rotor of the wind energy conversion system 10. The first module, serving as a frequency-dependent power compensator, is configured to mitigate the system frequency variations by determining a power correction signal 26 comprising a first power value $\Delta P_{kin}$ in order to either store or release kinetic energy in the rotating mass of the WECS.

The second module 24 provides a first reference signal 27 comprising a second power value $P_{e,MPP,ref}$ representing an estimate for a maximally extractable power from wind, and a second reference signal 28 comprising an optimum angular speed value $\omega_{e,MPP,ref}$ representing an estimate for a corresponding optimum angular speed. Both estimates correspond to a point of maximum power extraction (maximum power point, MPP). Hence, the second module 24 serves as an MPP estimator. The estimate of the maximum extractable power from wind is required in order to mitigate the system frequency variations while operating around the MPP.

The second module 24 receives the second input signal 22 comprising the angular speed values $\omega_e$. The second module 24 further receives a power feedback signal 29 comprising a third power value $\Delta P_{e,ref,add}$. The third power value AP e,ref,add corresponds to a difference of the output power value Pc,ref and the second power value $P_{e,MPP,ref}$. Hence, the third power value $\Delta P_{e,ref,add}$ describes a value of additional electric power that is demanded when mitigating the system frequency deviation at a particular time.

The first power value $\Delta P_{kin}$ of the power correction signal 26 and second power value $P_{e,MPP,ref}$ of the first reference signal 27 are added, resulting in an optimal power value $P_{opt}$.

The optimal power value $P_{opt}$ is optimal in the sense that a maximum of wind power is captured and system frequency variations are mitigated, but operational limits of the wind energy conversion system 10 are yet neglected.

The third module 25 provides the setpoint signal 20 for setting the output power value $P_{e,ref}$ of the wind energy conversion system 10 and assists in ensuring that the wind energy conversion system 10 operates within a defined safe operating region by requiring that angular speed limits and power limits of the wind energy conversion system 10 are respected.

First Module

A fluctuating feed-in of wind power will cause periodic system frequency variations around the (nominal) target frequency value $f_{nom}$. The periodic system frequency variations/oscillations of the system frequency $f_g$ around $f_{nom}$ are due to turbulence components of the wind speed. Beyond the periodic frequency variations, the system frequency $f_g$ also exhibits aperiodic variations due to system disturbance. With the first module 23, the periodic and aperiodic system frequency variations are mitigated by making use of the kinetic energy stored in the rotating mass of the wind energy conversion system 10.

FIG. 3 shows a graphical representation of the first module 23. The first module 23 comprises a first submodule 30 and a second submodule 31, each of which may be implemented in a respective separate or a shared signal processing device. The first input signal 21 is fed to both the first and the second submodule 30, 31. The first submodule 30 is configured to filter the first input signal 21 so as to mitigate the periodic frequency variations, while the second submodule 31 is configured to filter the first input signal 21 so as to mitigate the aperiodic frequency variations. The first submodule 30 generates a periodic power correction signal 32 comprising a filtered periodic power value $\Delta P_{kin,p}$. The second submodule 31 generates an aperiodic power correction signal 33 comprising a filtered aperiodic power value $\Delta P_{kin,a}$. The filtered periodic power value $\Delta P_{kin,p}$ of the periodic power correction signal 32 and the filtered aperiodic power value $\Delta P_{kin,a}$ of the aperiodic power correction signal 33 are added, yielding the first power value $\Delta P_{kin}$ of the power correction signal 26.

The first submodule 30 and/or the second submodule 31 may be activated or deactivated.

FIG. 4a shows a graphical representation of an exemplary time evolution of system frequency values $f_g$. A first curve 40 comprises the system frequency values $f_g$ depending on time t. The shown system frequency values $f_g$ have been measured by a phase locked loop at a point of common coupling of an exemplary grid connected wind energy conversion system 10, employing a power system model based on the Irish power transmission system, which has been adapted according to a future energy scenario in 2040. The energy scenario comprises a system penetration level of power electronic (PE) interfaced sources around 90%, of which 65% is supplied by wind, thus offering a challenging context in terms of system frequency variations. No method for mitigating the system frequency variations has been employed for obtaining the first curve 40.

As can be seen by FIG. 4a, for electric power systems 11 with a large share of wind power, the effect of the turbulence component on the system frequency values $f_g$ becomes substantial, resulting in large deviations of the system frequency values $f_g$ from the target frequency value $f_{nom}$ at 50 Hz.

According to the known Van der Hoven spectrum, a dominant frequency of the turbulence component of wind speed exists within the frequency range of a few mHz. Since the wind speed and therefore the active power feed-in of the wind energy conversion system 10 follow a characteristic wind speed spectrum, the spectrum of system frequency deviation values $\Delta f_g$ is expected to exhibit similar properties.

In this regard, FIG. 4b shows the spectrum of the system frequency deviation values $\Delta f_g$ for the energy scenario with 90% PE system penetration level. The spectrum as represented by a second curve 41 is obtained employing a fast Fourier transform/FFT for a time interval of 10 minutes. The second curve 41 comprises magnitudes $|\Delta f_g|$ of the system frequency deviation values $\Delta f_g$ depending on frequency components f. Distinctive frequency components f with large magnitudes (amplitudes) appear within a wind turbulence frequency range, e.g., at a maximum peak around 4.5 mHz.

As the system frequency deviation values $\Delta f_g$ are dominated by specific frequency components, the first submodule 30 is configured to identify frequency bands of dominating frequency components. This is supported by filtering.

FIG. 5 shows a graphical representation of the first submodule 30. From the first input signal 21 comprising the system frequency values $f_g$ an intermediate signal 50 comprising the system frequency deviation values $\Delta f_g$ is determined by subtracting the system frequency values $f_g$ from the target frequency value $f_{nom}$.

The first submodule comprises a frequency band identifying unit 51 and a plurality of band-pass filter units 52. Each of the band-pass filter units is assigned to one of the frequency bands identified by the frequency band identifying unit 51. For each one of the identified frequency bands, the frequency band identifying unit 51 determines one of a plurality of filter settings 53. Subsequently, each of the filter settings 53 is transmitted to one of the band-bass filter units 52. The band-pass filter units 52 are tuned according to the respective filter settings 53 comprising the determined frequency bands and correspondingly filter the intermediate signal 50, resulting in partial signals 54. Each of the band-pass filter units 52 passes only the assigned determined frequency band of the intermediate signal 50 and attenuates remaining frequency components outside the determined frequency band.

The number of band-pass filter units 52 is variable and can be chosen, e.g., depending on characteristics of the first input signal 21. The spectrum shown in FIG. 4b comprises two dominating frequency components 42, 43 at 2 mHz and 4.5 mHz, respectively. Hence, two band-pass filter units 52 should be employed. For other spectra, alternative selections can be made. The frequency band identifying unit 51 may be configured to determine the number of dominating frequency components. From the number of dominating frequency components, a number of activated band-pass filter units 52 may be determined.

The partial signals 54 are subsequently summed up, yielding a first filtered signal 55. By applying a first gain 56 with first gain parameter $K_{per}$ to the first filtered signal 55, the periodic power signal 32 comprising the filtered periodic power value $\Delta P_{kin,p}$ is determined. The filtered periodic power value $\Delta P_{kin,p}$ corresponds to a portion of rotor kinetic energy utilized for the periodic mitigating of the system frequency variations. By increasing the first gain parameter $K_{per}$, performance of the submodule 30 in mitigating the periodic frequency variations is increased.

Each of the band-pass filter units 52 is characterized by its passband and can be implemented in different ways, for example as a finite impulse response filter (FIR) or an infinite impulse response filter (IIR). The IIR filter provides a smaller filter size for a corresponding filter specification in comparison with the FIR filter. The filter size being smaller corresponds to fewer required arithmetic operations and a lower signal delay. Minimizing the signal delay is particularly important for counteracting the periodic frequency variations in time. Hence, employing the IIR filter may here be preferable.

A second order digital IIR filter is given by a transfer function G with $$G(z) = \frac{b_0 + b_1 z^{-1} + b_2 z^{-2}}{1 + a_1 z^{-1} + a_2 z^{-2}}, \tag{1}$$

where $a_1$, $a_2$, $b_0$, $b_1$, and $b_2$ are IIR filter coefficients. Designing the IIR filter comprises determining the IIR filter coefficients in order to meet desired frequency response specifications. Determining the IIR filter coefficients can be based on an analog filter prototype. For this, a second transfer function Ga of an analog filter in the s-domain is transformed into the transfer function G of the corresponding digital IIR filter in the z-domain. A second-order analog band-pass filter comprises the transfer function $G_a$ with $$G_a(s) = \frac{BWs}{s^2 + BWs + (2\pi f_r)^2}, \tag{2}$$

where BW denotes a −3 dB passband bandwidth and $f_r$ a center frequency.

FIG. 6 shows a Bode diagram of $G_a$ (s) with BW=2 mHz and $f_r$=4.5 mHz, magnitude M and frequency f. The passband bandwidth BW is identified by dashed lines 60, 61, where the magnitude M of $G_a$(s) is equal to −3 dB. By comparing the passband of the Bode diagram (as shown in FIG. 6) with a dominating peak bandwidth of one of the dominating frequency components (as shown in FIG. 4b), a choice of BW=2 mHz is considered to be adequate for the dominating frequency component at 4.5 mHz. The second transfer function Ga can be transformed to the transfer function G by for example applying a bilinear transform on the second transfer function $G_a$.

The band-pass filter units 52 can be tuned manually or automatically. If tuned manually, parameters of the band-pass filter units 52 are set to handle the dominating frequency components that are expected at certain frequency ranges. Continuous online changes of the dominant frequency components may be tracked through automatic tuning. Online tracking of the dominant frequency components is performed using the frequency band identifying unit 51. Automatic online tuning of the band-pass filter units 52 may be performed as follows.

FIG. 7 shows a graphical representation of the automatic online tuning of each the band-pass filter units 52 by determining the respective center frequency $f_r$. Starting at starting times $t_0$, $t_1$, and $t_2$ with step size $\Delta t$, three exemplary time windows 70, 71, 72 with window size W are determined for updating of the center frequency $f_r$. The window size W determines a first time interval over which the spectrum of the frequency deviations is calculated. The step size $\Delta t$ represents a second time interval between ending times of two successive time windows 70, 71, 72. Each of the time windows 70, 71, 72 is specified by its ending time $t_3$, $t_4$, and $t_5$, respectively. At each of the ending times $t_3$, $t_4$, and ty, the spectrum of the system frequency deviation values $\Delta f_g$ appearing in the corresponding time window 70, 71, 72 is determined by applying an FFT on the system frequency deviation values $\Delta f_g$ in the corresponding time window 70, 71, 72. Since the FFT is performed at the respective ending times $t_3$, $t_4$, and $t_5$, a third time interval between two consecutive FFT calculations is also given by $\Delta t$.

The step size $\Delta t$ may for example be 1 minute and the window size W may be 10 minutes. In this case, a first FFT is performed at a first ending time t=10 min for a first time window from t=0 min to t=10 min. A second FFT is performed at a second ending time t=11 min for a second time window from t=1 min to t=11 min. The determined spectrum is analyzed to determine the dominating frequency components, i.e., the frequency components with largest magnitudes.

In order to damp an i-th dominant frequency component $_{dom,i}$ via an i-th of the band-pass filter units 52, an i-th center frequency $f_{r,i}$ of the i-th of the band-pass filter units 52 is updated after every FFT calculation, i.e., after passing in time the step size $\Delta t$. Thereto, an i-th magnitude of an i-th spectrum at $f_{dom,i}$ is compared with a predefined spectrum threshold value. If the i-th magnitude of the i-th spectrum exceeds the spectrum threshold value, the i-i-th center frequency $f_{r,i}$ is changed and set equal to the dominant frequency component $f_{dom,i}$. Otherwise, the i-th center frequency $f_{r,i}$ is left unchanged. This is because a current setting of i-th center frequency $f_{r,i}$ provides sufficient damping of i-th dominant frequency component $f_{dom,i}$. Once all i-th center frequencies $f_{r,i}$ of the band-pass filter units 52 are updated, the band-pass filter units 52 operate with the updated i-th center frequencies $f_{r,i}$ until the next FFT calculation is performed.

FIG. 8 shows a graphical representation of the second submodule 31. Apart from only mitigating the periodic system frequency variations, also aperiodic system frequency variations can be addressed. Of particular concern in practice are those aperiodic system frequency variations that are characterized by a large rate of change of frequency (ROCOF). The aperiodic signal processor 31 can provide frequency support proportional to the ROCOF in order to mitigate the aperiodic system frequency variations due to system disturbance.

The first input signal 21 is filtered by a high-pass filter 81 with time constant $\tau_{in}$ and subsequently fed into a deadband 82, resulting in a second filtered signal 83. The second filtered signal is multiplied with the first input signal 21. The high-pass filter 81 can integrate a differentiator and a subsequent low-pass filter on the first input signal 21. Differentiating the first input signal 21 with the system frequency values $f_g$, a rate of change of the system frequency values $f_g$ is obtained, which represents the ROCOF. The low-pass filtering reduces effects from measurement noise arising from the differentiating of the first input signal 21. With the deadband 82, a given amplitude of the ROCOF is tolerated. The deadband 82 generates a zero output for inputs within its selected deadband. The deadband 82 may be adjustable. Delay times of the low-pass filter, indicated by $\tau_{in}$, can be between 50 ms and 500 ms. The differentiator and the low pass filter can be combined into one transfer function. The resulting transfer function is a high pass filter. The time constant $\tau_{in}$ is associated with the low-pass filter. A response of the second submodule 31 can be enhanced by increasing a second gain parameter $K_{aper}$ of a second gain 84. The second gain 84 provides the aperiodic power correction signal 33 comprising the filtered aperiodic power value $\Delta P_{kin,a}$.

Second Module

The second module 24 provides the second power value $P_{e,MPP,ref}$, representing the estimate for the maximally extractable power from wind, and the optimum angular speed value $\omega_{e,MPP,ref}$, representing the estimate for the corresponding optimum angular speed. The second power value $P_{e,MPP,ref}$ and the optimum angular speed value $\omega_{e,MPP,ref}$ are determined as follows.

A model for mechanical turbine power $P_{tur}$ that can be captured from wind by a wind turbine is given by:

$$P_{tur} = \frac{1}{2}\pi\rho r^2 V_w^3 C_P(\lambda), \tag{3}$$

with (rotor) tip speed ratio $$\lambda = \frac{2\omega_e r}{pV_w},$$

air density $\rho$, rotor blade length r, wind speed $V_w$, number of poles p of a generator of the wind energy conversion system 10, and power coefficient $C_p(\lambda)$.

FIG. 9 shows a typical relation of the power coefficient $C_p(\lambda)$ and the tip speed ratio $\lambda$, represented by a third curve 90. A power coefficient maximum 91 of the third curve 90 is reached at an optimal tip speed ratio $\lambda_{CPmax}$ that is defined as $$\lambda_{CPmax} = \frac{2\omega_{e,MPP} r}{pV_w}, \tag{4}$$

where the wind speed $V_w$ is considered as given and $\omega_{e,MPP}$ denotes a corresponding steady-state optimal angular speed of the rotor. For any given wind speed $V_w$, substituting the tip speed ratio $\lambda$ with the optimal tip speed ratio $\lambda_{CPmax}$ in Eq. (3) yields a maximum turbine power $P_{tur,max}$ corresponding to a steady-state optimal angular speed $\omega_{e,MPP}$:

$$P_{tur,max} = \frac{1}{2}\pi\rho r^2 V_w^3 C_P(\lambda_{CPmax}). \tag{5}$$

Substituting in Eq. (5) the wind speed $V_w$ according to Eq. (4) yields:

$$P_{tur,max} = \frac{4}{p^3}\pi\rho r^5 \frac{C_P(\lambda_{CPmax})}{\lambda_{CPmax}^3}\omega_{e,MPP}^3. \tag{6}$$

Neglecting losses, Eq. (6) also models a maximum electric output power $P_{e,MPP}|(d\omega_e/dt)=0$ of the wind energy conversion system 10 in a power steady state, where the power steady state is characterized by the angular speed value $\omega_e$ of the rotor being steady, i.e. $(d\omega_e/dt)=0$:

$$P_{e,MPP}|(d\omega_e/dt)=0=P_{tur,max} \tag{7}$$

For implementation in a maximum power point tracker, the second power value $P_{e,MPP,ref}$ of the first reference signal 27 is formulated as:

$$P_{e,MPP,ref} = K_{MPP}\omega^3_{e,MPP,ref} \tag{8}$$

with $$K_{MPP} = \frac{4}{p^3}\pi\rho r^5 \frac{C_P(\lambda_{CPmax})}{\lambda^3_{CPmax}}. \tag{9}$$

The optimum angular speed value $\omega_{e,MPP,ref}$ may be determined, as done in existing maximum power point trackers, by measuring the angular speed value $\omega_e$. This way, however, the effect of a change of electric output power, $\Delta P_{e,add}$, and a change of mechanical turbine power, $\Delta P_{tur,add}$, on the angular speed value $\omega_e$ are not accounted for. In contrast, the optimum angular speed value $\omega_{e,MPP,ref}$ may also be determined as follows.

A change of kinetic energy over an interval starting at time $t_0$ and ending at time t for a given moment of inertia J is represented by the left side of Eq. (10):

$$\frac{4}{p^2}\frac{1}{2}J\left(\omega^2_e(t_0) - \omega^2_e(t)\right) = \int_{t_0}^t (\Delta P_{e,add}(\tau) + \Delta P_{tur,add}(\tau))d\tau, \tag{10}$$

with a value change of the angular speed value $\omega_e$ from $\omega_e$ ($t_0$) at $t_0$ to $\omega_e(t)$ at t. The right side of Eq. (10) models a change of energy corresponding to the change of electric output power $\Delta P_{e,add}$ and the change of mechanical turbine power $\Delta P_{tur,add}$ from $t_0$ to t. The angular speed value $\omega_e$ at t (i.e., $\omega_e(t)$ ) can be obtained from present measurements with t representing a present real time. As such, the angular speed value $\omega_e$ is identified with its concrete measurement at time t, hence $\omega_e = \omega_e(t)$.

If the system 12 has been operating at the maximum power point at $t_0$, then a suitable estimate for the optimal angular speed value $\omega_{e,MPP,ref}$ of the rotor is given by $\omega_e(t_0)$, i.e., $\omega_{e,MPP,ref} = \omega_e(t_0)$. Thus, Eq. (10) can be rewritten as follows:

$$\frac{4}{p^2}\frac{1}{2}J\left(\omega^2_{e,MPP,ref} - \omega^2_e\right) = \int_{t_0}^t (\Delta P_{e,add}(\tau) + \Delta P_{tur,add}(\tau))d\tau. \tag{11}$$

Solving for the optimal angular speed value $\omega_{e,MPP,ref}$ in Eq. (11) yields:

$$\omega_{e,MPP,ref} = \sqrt{\frac{p^2}{2J}\int_{t_0}^t (\Delta P_{e,add}(\tau) + \Delta P_{tur,add}(\tau))\,d\tau + \omega^2_e}. \tag{12}$$

Inserting Eq. (12) into Eq. (8) results in:

$$P_{e,MPP,ref} = K_{MPP}\left(\frac{p^2}{2J}\int_{t_0}^t (\Delta P_{e,add}(\tau) + \Delta P_{tur,add}(\tau))d\tau + \omega^2_e\right)^{\frac{3}{2}}. \tag{13}$$

The change of electrical output power $\Delta P_{e,add}$ in Eq. (13) can readily be estimated from the third power value $\Delta P_{e,add,ref}$, which is also a second module input (cf. FIG. 2). With the third power value $\Delta P_{e,add,ref}$ further being a reference control signal, an action on the change of electric output power $\Delta P_{e,add}$ is delayed depending on a design of a power control loop. The power control loop can for example be characterized by a first-order delay:

$$\Delta P_{e,add} + \tau_{PL}\frac{d}{dt}\Delta P_{e,add} = \Delta P_{e,add,ref}, \tag{14}$$

with constant $\tau_{PL}$. The change of mechanical turbine power $\Delta P_{tur,add}$ is obtained by a dedicated calculator that uses a present measurement of the angular speed value $\omega_e$ and the optimum angular speed value $\omega_{e,MPP,ref}$ as inputs for the change of mechanical turbine power $\Delta P_{tur,add}$.

FIG. 10 shows a graphical representation of the second module 24. Representing Eq. (11) to Eq. (14) in the Laplace domain (s-domain) allows in particular for a transfer function representation of the second module 24. Calculating the change of mechanical turbine power $\Delta P_{tur,add}$ is optional. Still, as shown by simulations MPP tracking accuracy is improved and, in turn, mitigating of system frequency deviations.

The second input signal 22 comprising the angular speed value we and the power feedback signal 29 comprising the third power value $\Delta P_{e,ref,add}$ are provided. Subsequently, the change of electrical output power $\Delta P_{e,add}$ is determined from the third power value $\Delta P_{e,ref,add}$. Optionally, the change of mechanical turbine power $\Delta P_{tur,add}$ is determined from the angular speed value $\omega_e$ by a change of power calculator 100. In case the change of mechanical turbine power $\Delta P_{tur,add}$ has been determined, the change of electrical output power $\Delta P_{e,add}$ and the change of mechanical turbine power $\Delta P_{tur,add}$ are added. Subsequently, the change of electrical output power $\Delta P_{e,add}$ (or a sum of the change of electrical output power $\Delta P_{e,add}$ and the change of mechanical turbine power $\Delta P_{tur,add}$) are integrated by an integrator 101, yielding an integrated signal 102 comprising an integrated value. The integrated value may be represented as $$p^2/2J\int_{t_0}^\tau (\Delta P_{e,add}(\tau) + \Delta P_{tur,add}(\tau))d\tau.$$

The integrated value is added to a squared value of the angular speed value $\omega_e$ and subsequently subjected to a square root, yielding the second reference signal 28 comprising the optimal angular speed value $\omega_{e,MPP,ref}$. Raising the optimal angular speed value $\omega_{e,MPP,ref}$ to the power of 3 and applying a third gain 103 with a third gain parameter $K_{Mpp}$ yields the first reference signal 27 comprising the second power value $P_{e,MPP, ref}$.

Determining the Change in Mechanical Turbine Power

In the following, an example for determining the change in mechanical turbine power $\Delta P_{tur,add}$ is described. For this purpose, FIG. 11 shows a graphical representation of the mechanical turbine power $P_{tur}$ depending on the angular speed value $\omega_e$.

The mechanical turbine power Ptur can also be determined by $$P_{tur} = \frac{4}{p^3} \pi \rho r^5 \frac{C_P(\lambda)}{\lambda^3} \omega_e^3. \tag{15}$$

Eq. (15) is represented by a fourth curve 110 shown in FIG. 11.

For small variations around a steady-state operating point, the power coefficient $C_p(\lambda)$ may be approximated by a second order polynomial:

$$C_{P2}(\lambda) = c_{2,p} \lambda^2 + c_{1,p} \lambda + c_{0,p} \tag{16}$$

The mechanical turbine power $P_{tur}$ is modelled by replacing $C_P(\lambda)$ with $C_{P2}(\lambda)$ in Eq. (15) and then replacing the tip speed ratio $\lambda$ by $2\omega_e r/pV_w$ (cf. Eq. (3)):

$$P_{tur2} = \frac{1}{2} \pi \rho r^2 \left( c_{0,p} V_w^3 + \frac{2 c_{1,p} r}{p} V_w^2 \omega_e + \frac{4 c_{2,p} r^2}{p^2} V_w \omega_e^2 \right), \tag{17}$$

with the approximated mechanical turbine power $P_{tur2}$. Eq. (17) with approximating the power coefficient $C_P(\lambda)$ around the optimal tip speed ratio $\lambda_{CPmax}$ (cf. FIG. 9) is represented by a fifth curve 111. As can be seen by FIG. 11, the mechanical turbine power Ptur and the approximated mechanical turbine power $P_{tur2}$ are almost equal for small variations around the steady-state operating point.

Hence, in order to avoid wind power measurement devices, the change of mechanical turbine power $\Delta P_{tur,add}$ can be determined based on the approximated turbine power $P_{tur2}$. The change of mechanical turbine power $\Delta P_{tur,add}$ resulting from the change of the angular speed value from $\omega_e(t_0)$ at $t_0$ $\omega_e(t)$ t is defined as:

$$\Delta P_{tur,add} = P_{tur2}(t_0) - P_{tur2}(t) \tag{18}$$

If the wind speed $V_w$ is provided, Eq. (17) is considered as a quadratic function of the angular speed value $\omega_e$. A vertex 112 of the quadratic function is located at a point $(\omega_e(t_0), P_{tur2}(t_0))$. For a standard form quadratic function, that is, $y = ax^2 + bx + c$, the x-coordinate vertex is given by $-b/2\alpha$. Therefore, $\omega_e(t_0)$ can be derived from Eq. (17) as:

$$\omega_e(t_0) = \frac{-c_{1,p} p}{4 c_{2,p} r} V_w. \tag{19}$$

A model of the approximated mechanical turbine power $P_{tur2}(t_0)$ at time $t_0$ is given by inserting Eq. (19) into Eq. (17):

$$P_{tur2}(t_0) = \frac{\pi \rho r^2 \left( 4 c_{0,p} c_{2,p} - c_{1,p}^2 \right)}{8 c_{2,p}} V_w^3. \tag{20}$$

Accordingly, the approximated mechanical turbine power $P_{tur2}(t)$ at time t can be derived from Eq. (18) and Eq. (20) as follows:

$$P_{tur2}(t) = \frac{\pi \rho r^2 \left( 4 c_{0,p} c_{2,p} - c_{1,p}^2 \right)}{8 c_{2,p}} V_w^3 - \Delta P_{tur,add}. \tag{21}$$

The angular speed value $\omega_e(t)$ at time t can be determined by solving Eq. (17) after substituting $P_{tur2}$ (t) for $P_{tur2}$. Inserting Eq. (21) into Eq. (17) and rearranging yields $$a\omega_e^2(t) + b\omega_e(t) + c = 0 \tag{22}$$

with $$a = \frac{2\pi \rho c_{2,p} r^4}{p^2} V_w, \ b = \frac{\pi \rho c_{1,p} r^3}{p} V_w^2,$$

$$c = \Delta P_{tur,add} + \frac{1}{2} \pi \rho r^2 \left( c_{0,p} - \frac{\left( 4 c_{0,p} c_{2,p} - c_{1,p}^2 \right)}{4 c_{2,p}} \right) V_w^3. \tag{23}$$

The angular speed value $\omega_e(t)$ at time t can therefore be resolved from Eq. (22):

$$\omega_e(t) = \frac{-c_{1,p} p}{4 c_{2,p} r} V_w \left( 1 - \sqrt{\frac{-8 c_{2,p} \Delta P_{tur,add}}{\pi \rho r^2 c_{1,p}^2 V_w^3}} \right). \tag{24}$$

Replacing the wind speed $V_w$ via Eq. (19) and solving Eq. (24) to the change of mechanical turbine power $\Delta P_{tur,add}$ yields:

$$\Delta P_{tur,add} = \frac{8 \pi \rho r^5 c_{2,p}^2 \omega_e(t_0)(\omega_e(t_0) - \omega_e(t))^2}{p^3 c_{1,p}}. \tag{25}$$

Eq. (25) demonstrates that the change of mechanical turbine power $\Delta P_{tur,add}$ can be calculated from a time-dependent change $\omega_e(t_0) - \omega_e(t)$ in the angular speed value $\omega_e$. Since the system 12 is operating at the MPP at time $t_0$, for the optimum angular speed value $\omega_{e,MPP}$ holds $\omega_{e,MPP} = \omega_e(t_0)$. For the purpose of control implementation, the steady-state optimal angular speed $\omega_{e,MPP}$ is replaced with the optimal angular speed value $\omega_{e,MPP,ref}$, hence $\omega_{e,MPP,ref} = \omega_e(t_0)$. The angular speed value $\omega_e(t)$ at time t can be obtained from the present measurements (cf. Eq. (10) ff.), hence $\omega_e = \omega_e(t)$. As a result, Eq. (25) can be rewritten as follows:

$$\Delta P_{tur,add} = \frac{8 \pi \rho r^5 c_{2,p}^2 \omega_{e,MPP,ref}(\omega_{e,MPP,ref} - \omega_e)^2}{p^3 c_{1,p}}. \tag{26}$$

FIG. 12 shows a graphical representation of the change of power calculator 100 for determining the change in mechanical turbine power $\Delta P_{add,tur}$. The change of power calculator 100 implements Eq. (26). The change in mechanical turbine power $\Delta P_{add,tur}$ is determined from angular speed value $\omega_e$ of the second input signal 22 and the optimum angular speed value $\omega_{e,MPP,ref}$ of the second reference signal 28.

Third Module

The method for determining the setpoint signal 20 has to maintain stability of the wind energy conversion system 10 for all times. The output power value $P_{e,ref}$ of the setpoint signal 20 must adhere to corresponding stability limits. Considering an under-frequency condition, the frequency-dependent first power value $\Delta P_{kin}$ is positive and the output power value $P_{e,ref}$ is temporarily larger than $P_{e,MPP}$ $|(d\omega_{e/dt}) = 0$ with $d\omega_e/dt < 0$. This entails a deceleration of the rotating mass of the rotor.

FIG. 13*a* shows a graphical representation of a torque coefficient $C_T$ depending on the tip speed ratio $\lambda$. The torque coefficient $C_T$ is determined from the power coefficient $C_P$ by $C_T(\lambda)=C_P(\lambda)/\lambda$.

With regard to the angular speed value $\omega_e$, there is a corresponding tip speed ratio limit $\lambda_{CTmax}$ below which the torque coefficient $C_T$ increases with $\lambda$, i.e., $dC_T(\lambda)/d\lambda>0$. In such a first region 130 with $\lambda<\lambda_{CTmax}$, increasing the tip speed ratio $\lambda$, in turn leading to an increasing mechanical turbine torque, further increases the mechanical turbine torque, which is proportional to the torque coefficient $C_T$. For $\lambda=\lambda_{CTmax}$, the torque coefficient $C_T$ reaches its maximum. In a second region 131 with $\lambda>\lambda_{CTmax}$, and $dC_T(\lambda)/d\lambda<0$, an increasing tip speed ratio $\lambda$ reduces the torque coefficient $C_T$. This results in a stabilizing effect. Therefore, operating points in the second region 131 are preferred In order to provide a stability margin, a tip speed ratio lower limit $\lambda_{min}$ is defined with $\lambda_{min}>\lambda_{CTmax}$ and constitutes a lower limit for the tip speed ratio $\lambda$.

With the optimal tip speed ratio $\lambda_{CPmax}$ from Eq. (4) (cf. the third curve 90) and tip speed ratio lower limit $\lambda_{min}$ as shown in FIG. 13*a*, a lower angular speed limit $\omega_{min}$ is provided as a fixed ratio of the steady-state optimal angular speed $\omega_{e,MPP}$:

$$\omega_{e,min} = \frac{\lambda_{min}}{\lambda_{CPmax}}\omega_{e,MPP}. \tag{27}$$

For the purpose of control implementation, Eq. (27) is reformulated with a lower rotor limit $\omega_{e,min,ref}$ and the optimum angular speed value $\omega_{e,MPP,ref}$ as follows:

$$\omega_{e,min,ref} = \frac{\lambda_{min}}{\lambda_{CPmax}}\omega_{e,MPP,ref}. \tag{28}$$

Furthermore, the angular speed value $\omega_e$ should not surpass an upper angular speed limit $\omega_{e,max}$ due to mechanical constraints. Consequently, the angular speed value $\omega_e$ adheres to stability constraints represented by:

$$\omega_{e,min}\leq\omega_e\leq\omega_{e,max} \tag{29}$$

Providing an optimal power value $P_{opt}$, which is equal to $P_{e,MPP,ref}+\Delta P_{kin}$, does not yet account for the stability constraints. If the output power value $P_{e,ref}$ would be set equal to the optimal power value $P_{opt}$, then a corresponding operating point may lie outside the stability constraints. In order to comply with the stability constraints, the output power value $P_{e,ref}$ may have to be adapted. In case of $\omega_e\leq\omega_{e,MPP,ref}$, the output power value $P_{e,ref}$ is reduced to a specific percentage of the optimal power value $P_{opt}$, depending on the deviation of the angular speed value $\omega_e$ from the optimum angular speed value $\omega_{e,MPP,ref}$. If in turn $\omega_e\geq\omega_{e,MPP,ref}$, the optimal power value $P_{opt}$ is retained. Increasing the output power value $P_{e,ref}$ above the optimal power value $P_{opt}$ in this case could result in a desired reduction of rotor speed, but could also result in excess power to the electric power system 11 in times of oversupply indicated by an over-frequency condition. Therefore, limiting increased rotor speeds to the upper angular speed limit $\omega_{e,max}$ by means of pitch angle control is preferred if no other energy storage is available.

FIG. 13*b* shows a graphical representation for an exemplary embodiment to account for the stability constraints.

The output power value $P_{e,ref}$ can be determined from the optimal power value $P_{opt}$ and the angular speed value $\omega_e$ as follows:

$$P_{e,ref} = \begin{cases} P_{min} & \omega_e \leq \omega_{e,min,ref} \\ P_{min} + P_{opt}(1 - P_{min}) \\ \left(\sqrt[3]{\frac{\omega_{e,min,ref} - \omega_e}{\omega_{e,min,ref} - \omega_{e,MPP,ref}}}\right) & \omega_{e,min,ref} < \omega_e < \omega_{e,MPP,ref} \\ P_{opt} & \omega_e \geq \omega_{e,MPP,ref} \end{cases} \tag{30}$$

The output power value $P_{e,ref}$ as a function of the angular speed value $\omega_e$ is represented by a sixth curve 132. Based on the angular speed value $\omega_e$ and the optimum angular speed value $\omega_{e,MPP,ref}$, the third module 25 sets the output power value $P_{e,ref}$ to a certain percentage of the optimal power value $P_{opt}$. If the angular speed value $\omega_e$ drops below the optimum angular speed value $\omega_{e,MPP,ref}$, the output power value $P_{e,ref}$ is reduced by a cubic root relation that reflects a cubic relation of angular speed and power.

As can be seen in FIG. 13*b*, this leads to a rather small reduction of the output power value $P_{e,ref}$ for minor deviations of the angular speed value $\omega_e$ from the optimum angular speed value $\omega_{e,MPP,ref}$. If the angular speed value $\omega_e$ reaches the lower rotor limit $\omega_{e,min,ref}$, the output power value $P_{e,ref}$ is set to a minimum power value $P_{min}$. The minimum power value $P_{min}$ may be O W. Other values may be set, for example depending on applicable grid codes. The minimum power value $P_{min}$ is only reached temporarily, if at all, as the rotor quickly regains angular speed by the reduction of the output power value Pc.ref to a small fraction of the optimal power value $P_{opt}$. If the angular speed value $\omega_e$ rises above optimum angular speed value $\omega_{e,MPP,ref}$, the third module 25 retains $P_{opt}$ for output power value $P_{e,ref}$.

Validation

The effectiveness of the method in mitigating the system frequency variations is validated by means of implementation in the simulation software PowerFactory DIgSILENT. A nonlinear dynamic system model based on the transmission system of Ireland that was adjusted to specifications of a future energy scenario for 2040 has been employed. The system penetration level from power electronic interfaced sources is around 90%, of which 65% is supplied by wind farms.

For representing offshore and onshore wind farm behaviour, 1 786 turbine models are simulated considering individual wind speed profiles. The employed wind energy conversion system model represents a nonlinear WECS, modelling a rated power of 3 MW that is reached at a nominal wind speed of 12 m/s. Wind turbines are grouped into 35 onshore wind farms and four offshore wind farms of different sizes.

The performance of the method is assessed by comparing the simulation results of two scenarios. In a first scenario, all wind turbines within a wind farm are assumed to operate in a maximum power point tracking (MPPT) mode. The results are expected to describe a situation with large system frequency variations caused by wind farms since the WECS are not participating in the mitigation of the frequency variations. In a second scenario, the method is implemented in a WECS model. Here, two second order band-pass filters are utilized.

FIG. 14*a* shows a graphical representation of a first system frequency time evolution in case of standard MPPT operation, while FIG. 14*b* shows a graphical representation of a second system frequency time evolution in case of operation according to the proposed method. With the method, the system frequency variations are substantially reduced.

FIG. 14*c* shows a graphical representation of a first system frequency distribution with a first normalized histogram 140 and a first empirical distribution function 141 of the first system frequency time evolution shown in FIG. 14*a*. FIG. 14*d* shows a graphical representation of a second system frequency distribution with a second normalized histogram 142 and a second empirical distribution function 143 of the second system frequency time evolution shown in FIG. 14*b*. The first system frequency distribution comprises a first standard deviation of 46.2 mHz, whereas the second system frequency distribution comprises a second standard deviation of only 15.4 mHz. This corresponds to a 66.7% reduction of the first standard deviation.

FIG. 15*a* shows a graphical representation of a first spectrum of system frequency deviations of the first system frequency time evolution. FIG. 15*a* shows a graphical representation of a second spectrum of system frequency deviations of the second system frequency time evolution. When comparing the first and the second spectrum, a large reduction in peak magnitudes can be seen. An analysis of the first and the second spectrum confirms that the most dominating frequency components were eliminated.

FIG. 15*c* shows a graphical representation of a third system frequency time evolution in case of standard MPPT operation and FIG. 15*d* shows a graphical representation of a fourth system frequency time evolution in case of operation according to the proposed method. Additional time domain simulations were conducted to assess the effect of the proposed method with respect to the aperiodic frequency variations in case of an exemplary disturbance. A load step of 65 MW was simulated at a time instant t=4 min to represent the exemplary disturbance. The third system frequency time evolution fell below a system frequency limit of 49.8 Hz as shown in FIG. 15*c*. Such a limit violation was prevented for the corresponding fourth system frequency time evolution.

The features disclosed in this specification, the figures and/or the claims may be material for the realization of various embodiments, taken in isolation or in various combinations thereof.

The invention claimed is:

1. A method for determining a setpoint signal of a wind energy conversion system, the method, in a system comprising at least one signal processing device, comprising:

provuding a first input signal, comprising system frequency values of an electric power system, and a second input signal comprising an angular speed value of a wind energy conversion system;

determining, from the first input signal, an intermediate signal comprising system frequency deviation values, the system frequency deviation values indicating deviations between the system frequency values and a target frequency value, including determining at least one periodic frequency component from the first input signal;

determining, from the intermediate signal and the first input signal, a power correction signal comprising a first power value;

determining, from the second input signal, a first reference signal comprising a second power value corresponding to a point of maximum power extraction of the wind energy conversion system;

determining, from the power correction signal and the first reference signal, a setpoint signal for setting an output power value of the wind energy conversion system; and storing or releasing kinetic energy in the rotating mass of the wind energy conversion system based on the first power value of the power correction signal;

wherein said determining of the power correction signal comprises:

identifying frequency bands of dominating frequency components in the intermediate signal;

determining the number of dominating frequency components;

determining a number of activated band-pass filter units from the number of dominating frequency components;

using the activated band-pass filter units to filter the intermediate signal, resulting in partial signals; and summing the partial signals to yield the first power value.

2. The method according to claim 1, wherein the filtering is carried out using an infinite impulse response filter.

3. The method according to claim 1, further comprising determining aperiodic system frequency deviations from the first input signal.

4. The method according to claim 1, further comprising determining, from the first input signal, a second filtered signal by filtering the first input signal.

5. The method according to claim 4, wherein determining the second filtered signal further comprises at least one of: differentiating the first input signal, low-pass filtering the first input signal, and applying a deadband on the first input signal.

6. The method according to claim 1, wherein determining the first reference signal further comprises determining a change in electrical output power.

7. The method according to claim 1, further comprising determining, from the second input signal, a second reference signal comprising an optimum angular speed value corresponding to the point of maximum power extraction of the wind energy conversion system.

8. The method according to claim 7, wherein determining the first reference signal further comprises determining a change in mechanical turbine power.

9. The method according to claim 7, wherein the optimal power value is subject to a decrease when the angular speed value of the wind energy conversion system is smaller than the optimum angular speed value.

10. The method according to claim 1, wherein determining the setpoint signal comprises determining an optimal power value from the power correction signal and the first reference signal and changing the optimal power value depending on the angular speed value of the wind energy conversion system.

11. A system for determining a setpoint signal of a wind energy conversion system, comprising at least one signal processing device, the at least one signal processing device configured to perform the method according to claim 1.

* * * * *